US012770597B2

(12) United States Patent
He et al.

(10) Patent No.: US 12,770,597 B2
(45) Date of Patent: Oct. 20, 2026

(54) SONG PROCESSING METHOD AND APPARATUS, ELECTRONIC DEVICE, AND READABLE STORAGE MEDIUM

(71) Applicant: Tencent Technology (Shenzhen) Company Limited, Shenzhen (CN)

(72) Inventors: Fen He, Shenzhen (CN); Feng Lin, Shenzhen (CN); Qinghua Zhong, Shenzhen (CN); Rong Li, Shenzhen (CN); Sihua Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1156 days.

(21) Appl. No.: 17/847,027

(22) Filed: Jun. 22, 2022

(65) Prior Publication Data

US 2022/0319482 A1 Oct. 6, 2022

Related U.S. Application Data

(63) Continuation of application No. PCT/CN2021/093832, filed on May 14, 2021.

(30) Foreign Application Priority Data

Jun. 2, 2020 (CN) ......................... 202010488471.7

(51) Int. Cl.
*G10H 1/36* (2006.01)
*G09B 15/00* (2006.01)
(Continued)

(52) U.S. Cl.
CPC ............. *G10H 1/366* (2013.01); *G09B 15/00* (2013.01); *G09B 19/00* (2013.01); *G10H 1/0025* (2013.01); *H04L 51/10* (2013.01)

(58) Field of Classification Search
CPC ...... G10H 1/366; G10H 1/0025; G09B 15/00; G09B 19/00; H04L 51/10
See application file for complete search history.

(56) References Cited

U.S. PATENT DOCUMENTS

2014/0365887 A1* 12/2014 Cameron ................ G06T 11/60
715/716

FOREIGN PATENT DOCUMENTS

CN 102456340 A * 5/2012
CN 105635129 A 6/2016
(Continued)

OTHER PUBLICATIONS

Tencent Technology, ISR, PCT/CN2021/093832, Aug. 3, 2021, 3 pgs.
(Continued)

*Primary Examiner* — Jianchun Qin
(74) *Attorney, Agent, or Firm* — Morgan, Lewis & Bockius LLP

(57) ABSTRACT

This application provides a song processing method performed by a computer device. The method includes: presenting a song recording interface in response to a singing instruction triggered in a session interface of a group chat session; recording a song in response to a song recording instruction triggered in the song recording interface, and determining a reverberation effect corresponding to the recorded song; and transmitting, in response to a song transmitting instruction, a target song obtained by processing the song based on the reverberation effect to members of the group chat session, presenting a session message corresponding to the target song in the session interface, and presenting the pick-up singing function item corresponding to the target song in the session interface, the pick-up singing
(Continued)

function item being used for implementing pick-up singing of the target song by a member of the group chat session.

19 Claims, 39 Drawing Sheets

(51) Int. Cl.

| | |
|---|---|
| ***G09B 19/00*** | (2006.01) |
| ***G10H 1/00*** | (2006.01) |
| ***H04L 51/10*** | (2022.01) |

(56) References Cited

FOREIGN PATENT DOCUMENTS

| | | | | | |
|---|---|---|---|---|---|
| CN | 105827849 | A | | 8/2016 | |
| CN | 106233382 | A | | 12/2016 | |
| CN | 106559469 | A | | 4/2017 | |
| CN | 110381197 | A | | 10/2019 | |
| CN | 110491358 | A | | 11/2019 | |
| CN | 111061405 | A | | 4/2020 | |
| CN | 111106995 | A | | 5/2020 | |
| CN | 111131867 | A | * | 5/2020 | ......... H04N 21/4126 |
| CN | 111404808 | A | | 7/2020 | |
| JP | 2003256552 | A | | 9/2003 | |
| JP | 2010014823 | A | | 1/2010 | |
| JP | 2014219458 | A | | 11/2014 | |
| WO | WO 2018217790 | A1 | | 11/2018 | |

OTHER PUBLICATIONS

Tencent Technology, WO, PCT/CN2021/093832, Aug. 3, 2021, 5 pgs.

Tencent Technology, IPRP, PCT/CN2021/093832, Dec. 6, 2022, 6 pgs.

Tencent Technology, Singaporean Search Report and Written Opinion, SG Patent Application No. 11202250323P, Dec. 2, 2024, 11 pgs.

* cited by examiner

Grabbing singing of all members 15 people including often, Cartoon, chili, and the like complete grabbing singing of the song "Pstereo". View Singing of a designated member 3 people including Cartoon, often, and chili complete pick-up singing of the song "Pstereo". View Male and female groups 15 people including often, Cartoon, chili, and the like complete pick-up singing of the male and female groups for the song "Pstereo". View Random group 3 people including Cartoon, often, and chili complete pick-up singing of a self-selected group for the song "Pstereo". View Designated group 3 people including Cartoon, often, and Chili complete pick-up singing of the designated group for the song "Pstereo". View

FIG. 28

SONG PROCESSING METHOD AND APPARATUS, ELECTRONIC DEVICE, AND READABLE STORAGE MEDIUM

CROSS-REFERENCE TO RELATED APPLICATIONS

This application is a continuation application of PCT Patent Application No. PCT/CN2021/093832, entitled "SONG PROCESSING METHOD AND APPARATUS, ELECTRONIC DEVICE, AND READABLE STORAGE MEDIUM" filed on May 14, 2021, which claims priority to Chinese Patent Application No. 202010488471.7, filed with the State Intellectual Property Office of the People's Republic of China on Jun. 2, 2020, and entitled "SONG PROCESSING METHOD", all of which are incorporated herein by reference in their entirety.

FIELD OF THE TECHNOLOGY

This application relates to the field of artificial intelligence technologies and cloud technologies, and in particular, to a song processing method and apparatus, an electronic device, and a computer-readable storage medium.

BACKGROUND OF THE DISCLOSURE

A social application is usually a service that provides instant exchange of messages based on the Internet for a user, allowing two or more people to instantly transmit text information, a file, voice and video communication through a network. With the development of social applications, the social application is penetrated into lives of people, and more and more people use the social application to communicate.

An artificial intelligence technology is a comprehensive discipline, including both a hardware-level technology and a software-level technology. The artificial intelligence software technologies mainly include several major directions such as a computer vision technology, a speech processing technology, a natural language processing technology, and machine learning/deep learning. The speech technology is a key technology in the field of artificial instructions, to make a computer able to listen, see, speak, and feel is a future development direction of human-computer interaction.

In a process of communicating by using the social application, a user requires to transmit a song sung by the user. In the related art, the user can transmit the song sung by the user by using only a voice recording function, but a sound effect of the song recorded by using the voice recording function is relatively poor, which affects singing experience of the user.

SUMMARY

Embodiments of this application provide a song processing method and apparatus, an electronic device, and a computer-readable storage medium, which can add a reverberation effect to a recorded song, and beautify the recorded song.

The technical solutions in the embodiments of this application are implemented as follows.

An embodiment of this application provides a song processing method performed by a computer device, including:

- presenting a song recording interface in response to a singing instruction triggered in a session interface of a group chat session;

- recording a song in response to a song recording instruction triggered in the song recording interface, and determining a reverberation effect corresponding to the recorded song;
- transmitting, in response to a song transmitting instruction, a target song obtained by processing the song based on the reverberation effect to members of the group chat session; and
- presenting a session message corresponding to the target song in the session interface, and presenting a pick-up singing function item corresponding to the target song in the session interface,
- the pick-up singing function item being used for implementing pick-up singing of the target song by a member of the group chat session.

An embodiment of this application provides a computer device, including:

- a memory, configured to store executable instructions; and
- a processor, configured to implement the song processing method provided in the embodiments of this application when executing the executable instructions stored in the memory.

An embodiment of this application provides a non-transitory computer-readable storage medium, storing executable instructions, the executable instructions, when executed by a processor of a computer device, causing the computer device to implement the song processing method provided in the embodiments of this application.

The embodiments of this application have the following beneficial effects:

In an application scenario of a social session, a reverberation effect can be added to a recorded song, and the recorded songs can be beautified, which makes the recorded song more diverse, and implements a good immersive perception in a singing scenario, and pick-up singing may be further performed on a target song, thereby improving interaction efficiency of the session in the social application, and saving computing resources and communication resources used during session interaction.

BRIEF DESCRIPTION OF THE DRAWINGS

FIG. 28 is prompt information corresponding to each pick-up singing mode according to an embodiment of this application.

DESCRIPTION OF EMBODIMENTS

To make objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) A bubble is an outer frame used for carrying a normal message.

2) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

3) A reverberation effect is used for superimposing a sound effect of another audio on an original sound, that is, a special effect used for superimposing an atmosphere, such as a KTV special effect, a valley special effect, or a concert special effect.

Figure 1:
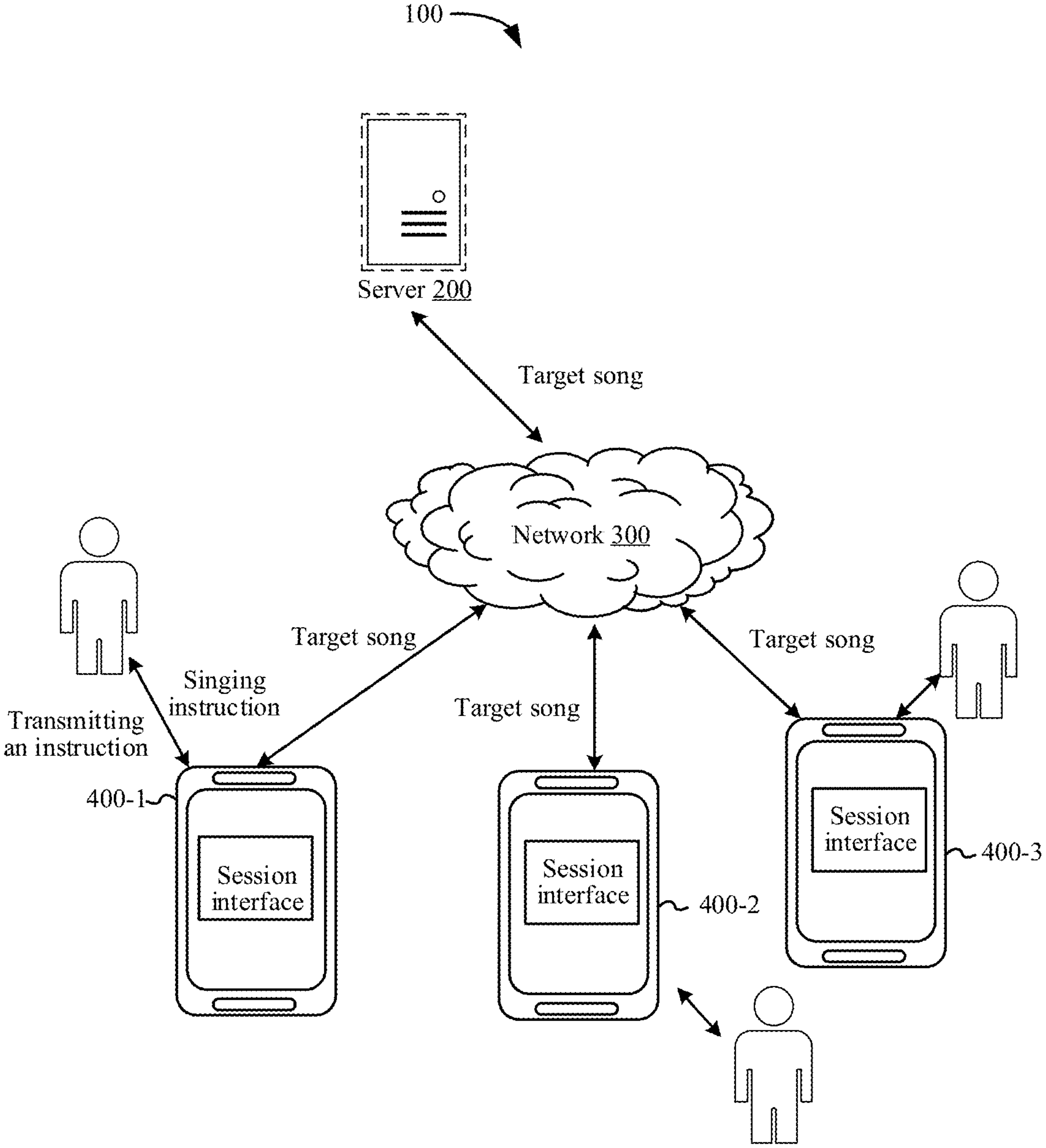
FIG. 1 is a schematic architectural diagram of a song processing system 100 according to an embodiment of this application.

FIG. 1 is a schematic architectural diagram of a song processing system 100 according to an embodiment of this application. To support an exemplary application, a terminal includes a terminal 400-1, a terminal 400-2, and a terminal 400-3. The terminal 400-1 is a terminal of a user A, the terminal 400-2 is a terminal of a user B, the terminal 400-3 is a terminal of a user C, and the users A, B, and C are members of a same group. The terminal is connected to a server 200 through a network 300. The network 300 may be a wide area network, a local area network, or a combination of the wide area network and the local area network.

The terminal 400-1 is configured to present a song recording interface in response to a singing instruction triggered in a session interface; record a song in response to a song recording instruction triggered in the song recording interface, and determine a reverberation effect corresponding to the recorded song; and transmit, by using a session window and in response to a song transmitting instruction, a target song obtained by processing the song based on the reverberation effect, and present a session message corresponding to the target song in the session interface.

Herein, the session interface is a session interface corresponding to a group whose members are the users A, B, and C.

The server 200 is configured to obtain members of a current group after the target song is received; and transmit the target song to the terminal 400-2 and the terminal 400-3 according to a member list.

The terminal 400-2 and the terminal 400-3 are configured to receive the target song, and present the session message corresponding to the target song in the session interface.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in the embodiments of this application.

Figure 2:
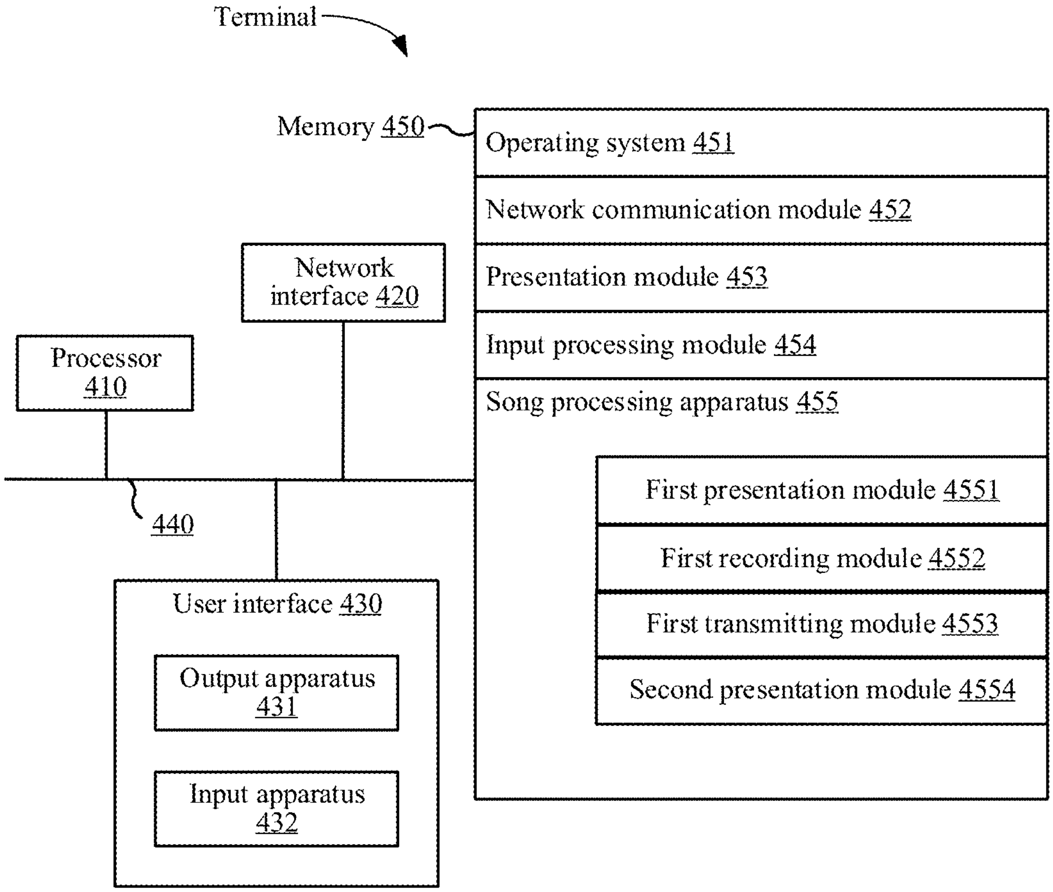
FIG. 2 is a schematic structural diagram of a terminal according to an embodiment of this application.

FIG. 2 is a schematic structural diagram of a terminal according to an embodiment of this application. The terminal shown in FIG. 2 includes: at least one processor 410, a memory 450, at least one network interface 420, and a user interface 430. All components in the terminal are coupled together by using a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 2.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 430 includes one or more output apparatuses 431 that can present media content, including one or more speakers and/or one or more visual display screens. The user interface 430 further includes one or more input apparatuses 432, including a user interface component helping a user input, for example, a keyboard, a mouse, a microphone, a touch display screen, a camera, or another input button and control member.

The memory 450 may be a removable memory, a non-removable memory, or a combination thereof. Exemplary hardware devices include a solid-state memory, a hard disk drive, an optical disc driver, and the like. The memory 450 may include one or more storage devices physically away from the processor 410.

The memory 450 includes a volatile memory or a non-volatile memory, or may include a volatile memory and a non-volatile memory. The non-volatile memory may be a read-only memory (ROM). The volatile memory may be a random access memory (RAM). The memory 450 described in the embodiments of this application is to include any other suitable type of memories.

In some embodiments, the memory 450 may store data to support various operations. Examples of the data include a program, a module, a data structure, or a subset or a superset thereof. The following provides descriptions by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A presentation module 453 is configured to present information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the song processing apparatus provided in the embodiments of this application may be implemented by using software. FIG. 2 shows a song processing apparatus 455 stored in the memory 450. The song processing apparatus may be software in a form such as a program or a plug-in, and includes the following software modules: a first presentation module 4551, a first recording module 4552, a first transmitting module 4553, and a second presentation module 4554. These modules are logical modules, and may be randomly combined or further divided based on a function to be implemented.

The following describes a function of each module.

In some other embodiments, the song processing apparatus provided in the embodiments of this application may be implemented by using hardware. For example, the song processing apparatus provided in the embodiments of this application may be a processor in a form of a hardware decoding processor, programmed to perform the song processing method provided in the embodiments of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or another electronic component.

Figure 3:
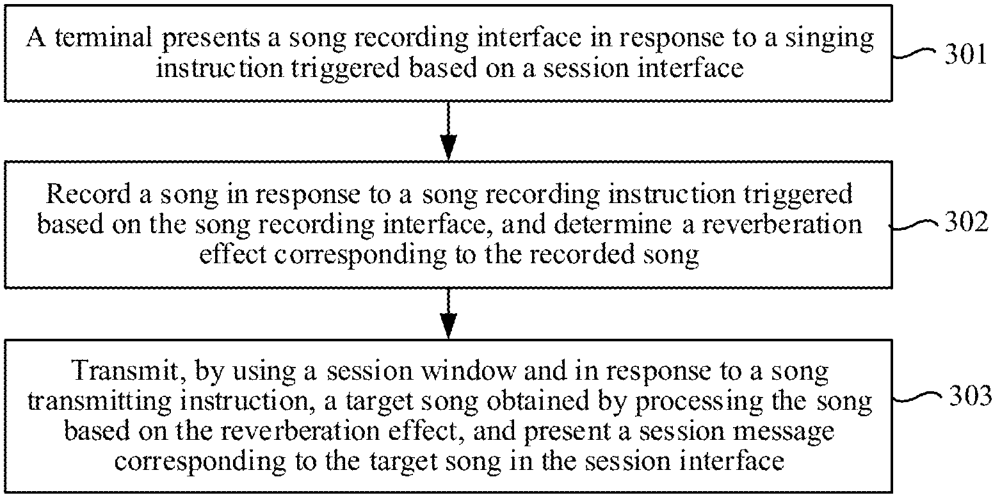
FIG. 3 is a schematic flowchart of a song processing method according to an embodiment of this application.

The song processing method provided in the embodiments of this application is described with reference to an exemplary application and implementation of the terminal provided in the embodiments of the application. FIG. 3 is a schematic flowchart of a song processing method according to an embodiment of this application, and steps shown in FIG. 3 are combined for description.

Step 301: A terminal presents a song recording interface in response to a singing instruction triggered in a session interface of a group chat session.

During actual implementation, an instant messaging client is installed on the terminal. A session interface is presented by using the instant messaging client. A user may communicate with another user by using the session interface. In a process that the user communicates with the another user by using the session interface, if the user needs to record and transmit a song, a singing instruction may be triggered by using the session interface. After receiving the singing instruction, the terminal presents a song recording interface.

In some embodiments, the terminal may trigger the singing instruction in the following manners: presenting the session interface, and presenting a voice function item in the session interface; presenting at least two voice modes in response to a trigger operation on the voice function item; and receiving a selection operation for a voice mode as a singing mode, and triggering the singing instruction.

Herein, during actual application, the voice function item is a native function item of the instant messaging client, which is natively embedded in the instant messaging client without using a third-party application or a third-party control. By running the instant messaging client and presenting the session interface, the user may see the voice function item presented in the session interface instead of being floated on the session interface.

Herein, the trigger operation may be a click/tap operation, a double-click/tap operation, a press operation, a slide operation, or the like. The selection operation may also be a click/tap operation, a double-click/tap operation, a press operation, a slide operation, or the like. This is not limited herein.

During actual implementation, a session toolbar is presented in the session interface, and the voice function item is presented in the session toolbar. After the trigger operation on the voice function item is received, a voice panel is presented, and the at least two voice modes are presented in the voice panel. The at least two voice modes may be presented in another manner. For example, a pop-up window is presented and the at least two voice modes are presented in the pop-up window. The at least two voice modes include at least the singing mode. After the selection operation for the song mode option is received, the singing instruction is triggered.

Herein, the selection operation may be a click/tap operation, a double-click/tap operation, a press operation, a slide operation, or the like. This is not limited herein.

Figure 4:
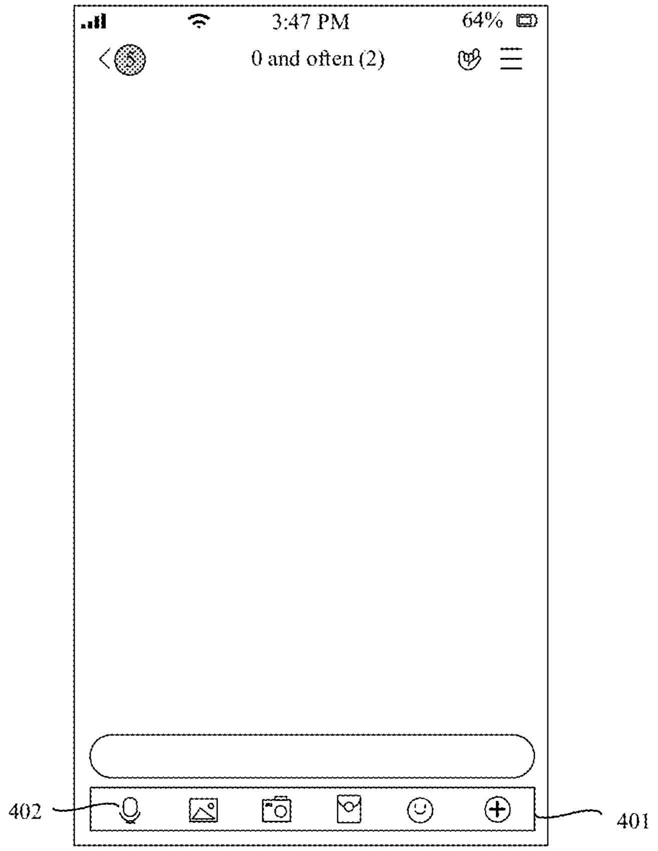
FIG. 4 and FIG. 5 are schematic diagrams of a session interface according to an embodiment of this application.
Figure 5:
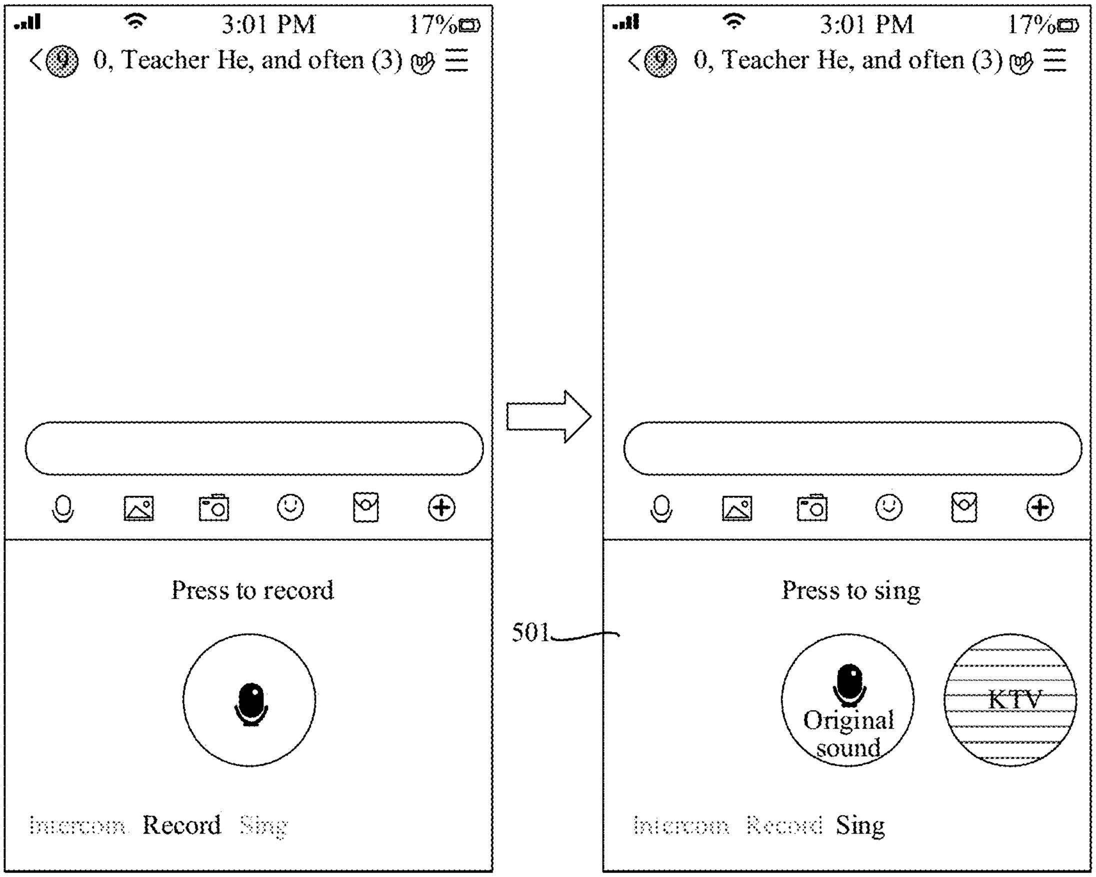

For example, FIG. 4 and FIG. 5 are schematic diagrams of a session interface according to an embodiment of this application. Referring to FIG. 4, a voice function item 402 is presented in a session toolbar 401. Referring to FIG. 5, after a click/tap operation of a user on the voice function item 402 is received, the session toolbar 401 moves upward, a voice panel is presented below the session toolbar 401, and a recording interface of a selected voice mode and three voice modes are presented in the voice panel. The three voice modes are an intercom mode option, a recoding mode option, and a singing mode. Herein, a singing instruction may be triggered by clicking/tapping the singing mode, and a song recording interface 501 is presented.

In some embodiments, the singing instruction may be triggered in the following manners: presenting the session interface, and presenting a singing function item in the session interface; and triggering the singing instruction, in response to a trigger operation for the singing function item.

During actual application, the song function item is a native function item of the instant messaging client, which is natively embedded in the instant messaging client without using a third-party application or a third-party control. By running the instant messaging client and presenting the session interface, the user may see the singing function item presented in the session interface instead of being floated on the session interface.

Figure 6:
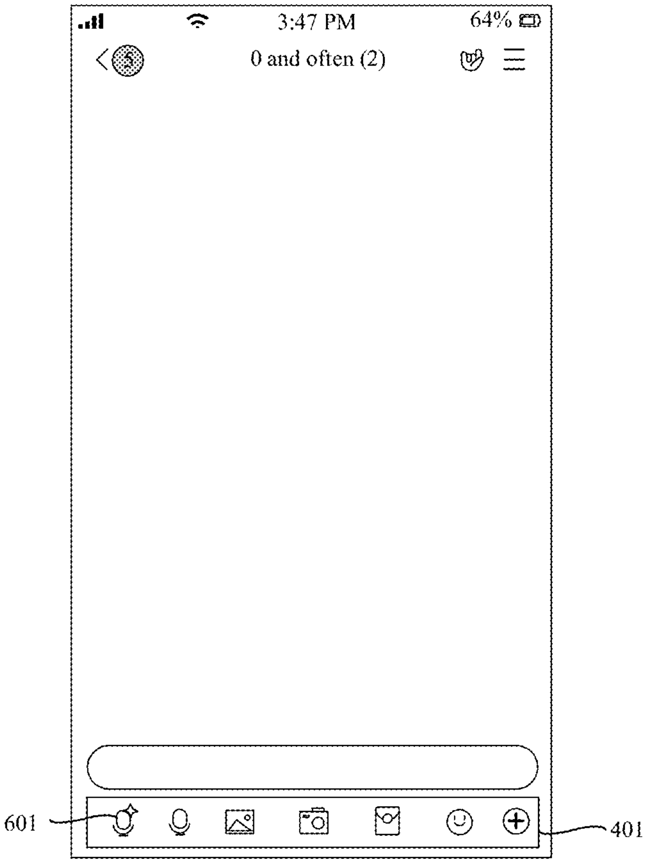
FIG. 6 is a schematic diagram of a session interface according to an embodiment of this application.

During actual implementation, the singing function item may be directly presented in the session toolbar, to trigger the singing instruction based on the singing function item, thereby simplifying an operation of the user. For example, FIG. 6 is a schematic diagram of a session interface according to an embodiment of this application. A singing function item 601 is presented in the session toolbar 401. When a click/tap operation on the singing function item 601 is received, the singing instruction is triggered.

Step 302: Record a song in response to a song recording instruction triggered in the song recording interface, and determine a reverberation effect corresponding to the recorded song.

During actual implementation, a song may be first recorded, and then a reverberation effect corresponding to the recorded song is determined. Alternatively, a reverberation effect corresponding to a recorded song may be first determined, and then the song is recorded. An execution order thereof is not limited.

In some embodiments, the terminal may determine the reverberation effect corresponding to the recorded song in the following manners: presenting at least two reverberation effects in the song recording interface; and determining a corresponding target reverberation effect as the reverberation effect corresponding to the recorded song, in response to a reverberation effect selection instruction triggered for a target reverberation effect.

During actual implementation, at least two reverberation effects may be directly presented in the song recording interface for selection based on the at least two presented reverberation effects. All selectable reverberation effects may be presented in the song recording interface herein, or only some selectable reverberation effects may be presented in the song recording interface. For example, some reverberation effects may be displayed first, and the presented reverberation effects may be switched based on an operation triggered by the user.

Figure 7:
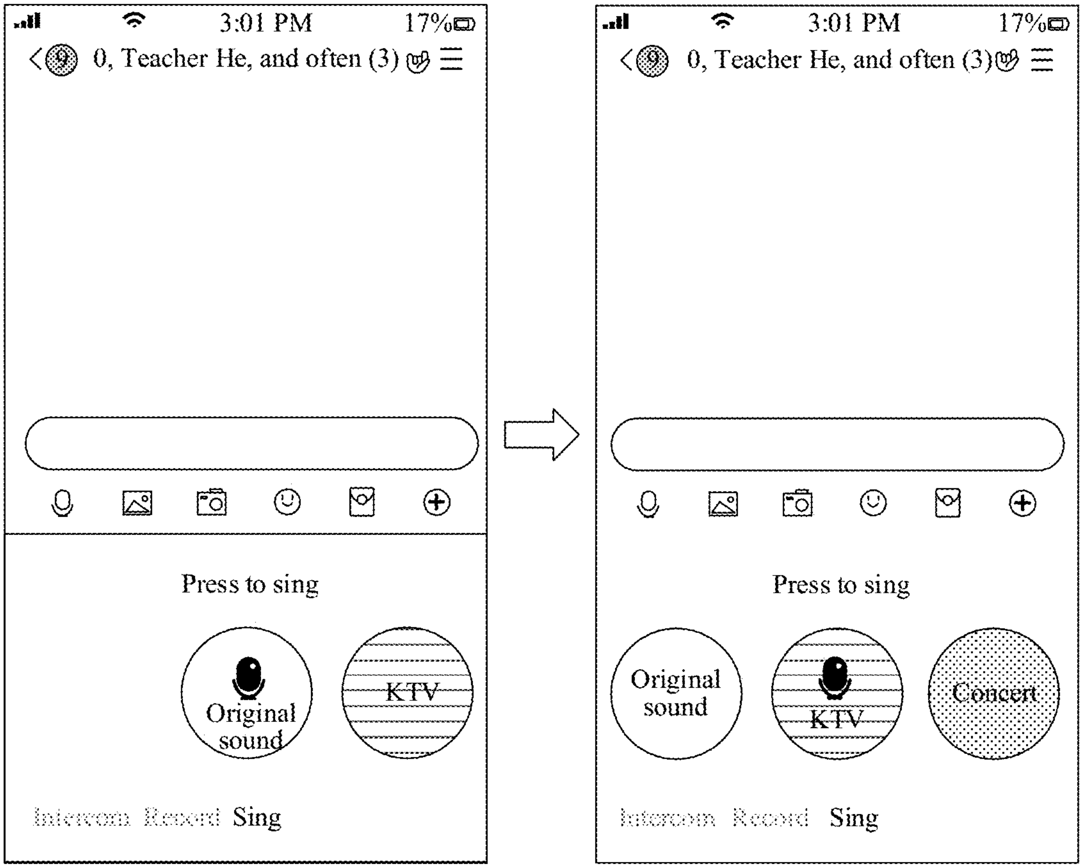
FIG. 7 is a schematic diagram of a session interface according to an embodiment of this application.

The reverberation effect selection instruction herein triggered for the target reverberation effect may be triggered by clicking/tapping the target reverberation effect, or may be triggered by using a slide operation, or may be triggered in another manner. A slide operation is used as an example for description. FIG. 7 is a schematic diagram of a session interface according to an embodiment of this application. Referring to FIG. 7, when a user performs a slide operation to left, it is determined that the target reverberation effect is switched from an original sound to KTV.

In some embodiments, the terminal may determine the reverberation effect corresponding to the recorded song in the following manners: presenting a reverberation effect selection function item in the song recording interface; presenting a reverberation effect selection interface in response to a trigger operation on the reverberation effect selection function item; presenting at least two reverberation effects in the reverberation effect selection interface; and determining a corresponding target reverberation effect as the reverberation effect corresponding to the recorded song in response to a reverberation effect selection instruction triggered for a target reverberation effect.

The reverberation effect selection interface herein is an interface independent of the song recording interface. During actual implementation, the at least two reverberation effects may be presented in a secondary interface independent of the reverberation effect instead of being directly presented in the song recording interface and are selected based on the secondary interface.

Figure 8:
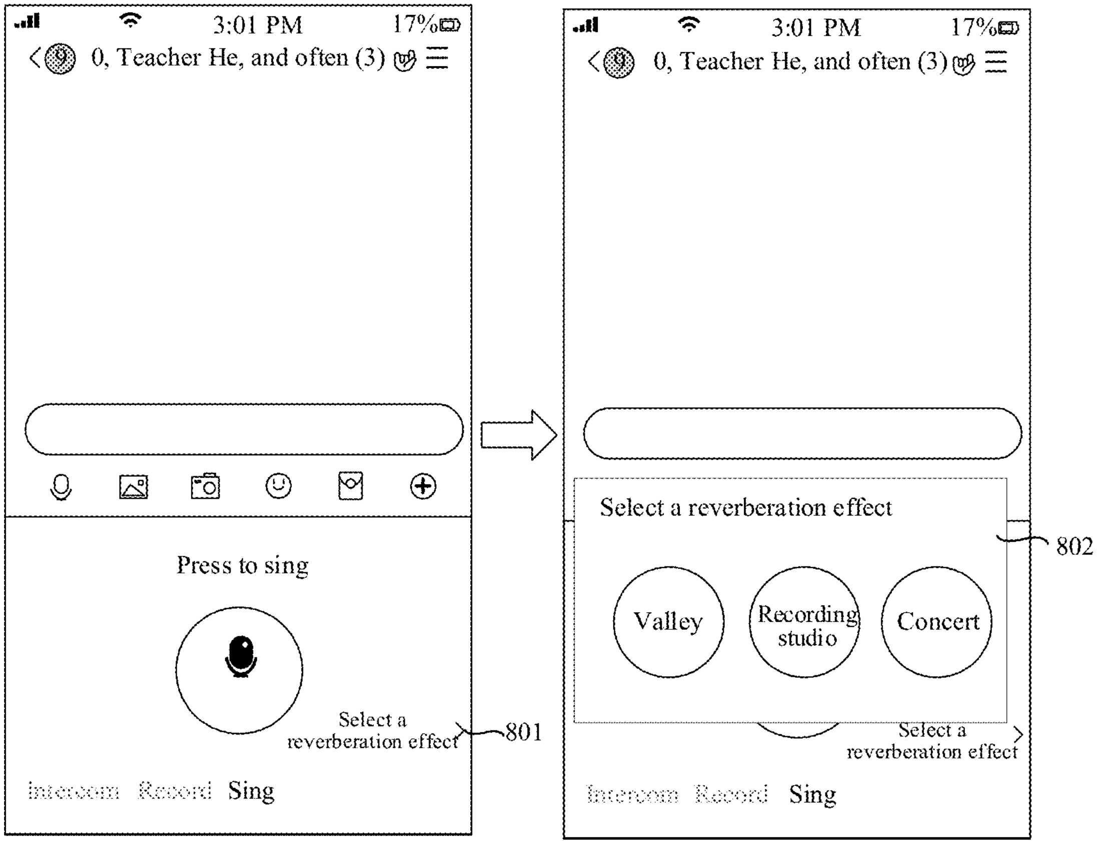
FIG. 8 is a schematic diagram of an interface of selection of a reverberation mode according to an embodiment of this application.

For example, FIG. 8 is a schematic diagram of an interface of selection of a reverberation mode according to an embodiment of this application. Referring to FIG. 8, a reverberation effect selection function item 801 is presented in a song recording interface. When a click/tap operation on the reverberation effect selection function item 801 is received, a reverberation effect selection interface 802 is presented, and reverberation effects are presented in the reverberation effect selection interface.

In some embodiments, the song may be recorded in the following manners: presenting a song recording button in the song recording interface; recording the song in response to a press operation for the song recording button; and finishing recording the song when the press operation is stopped, to obtain the recorded song.

During actual implementation, when a press operation for a recording button is received, the terminal invokes an audio collector such as a microphone to record a song, and stores the recorded song in a cache. Moreover, during recording, a sound wave may be presented in the song recording interface to represent that the sound is received. A recorded duration may further be presented.

Figure 9:
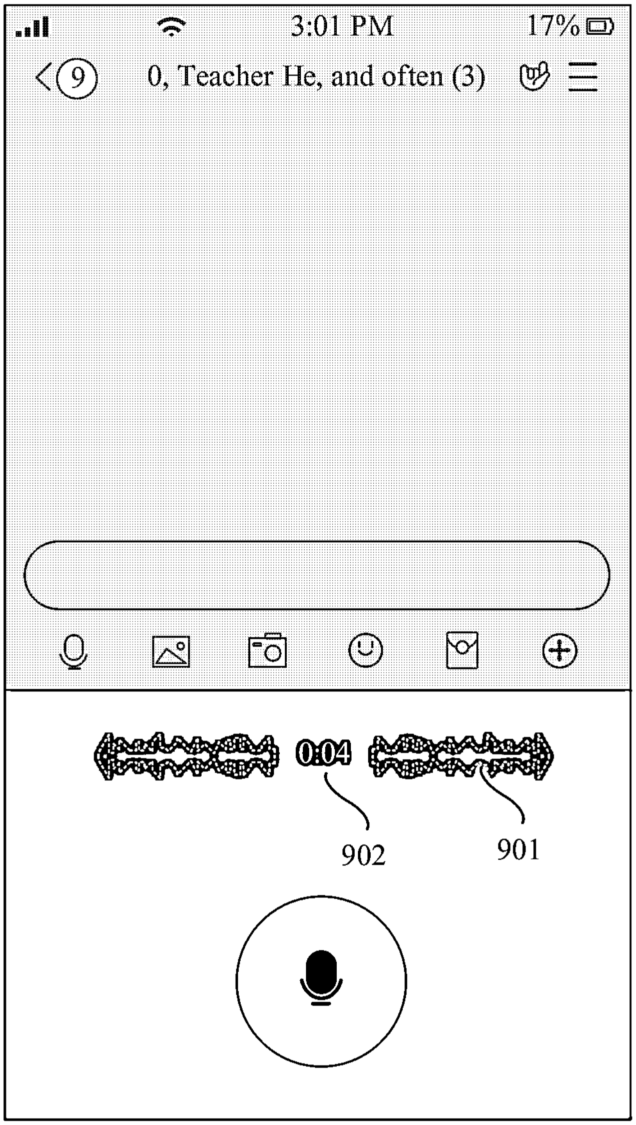
FIG. 9 is a schematic diagram of a session interface according to an embodiment of this application.

For example, FIG. 9 is a schematic diagram of a session interface according to an embodiment of this application. Referring to FIG. 9, a sound wave 901 and a recorded duration 902 are presented in the song recording interface.

A recorded song herein may be a complete song or a song episode.

In some embodiments, after the song recording button is clicked/tapped, the song may be recorded. When the song recording button is clicked/tapped again, recording of the song is finished, to obtain the recorded song.

In some embodiments, the song may be recorded in the following manners: presenting a song recording button in the song recording interface; recording the song in response to a press operation for the song recording button, and recognizing the recorded song during recording; presenting corresponding song information in the song recording interface when the corresponding song is recognized; and finishing recording the song when the press operation is stopped, to obtain the recorded song.

During actual implementation, the recorded song may be recognized during recording, that is, the recorded song is matched with a song in a music library according to at least one of a melody or lyrics of the recorded song. When there is a song matching the recorded song in the music library, song information of the matched song is obtained, and the corresponding song information is presented in the song recording interface. The song information herein may include lyrics, a poster, a song name, and the like.

Figure 10:
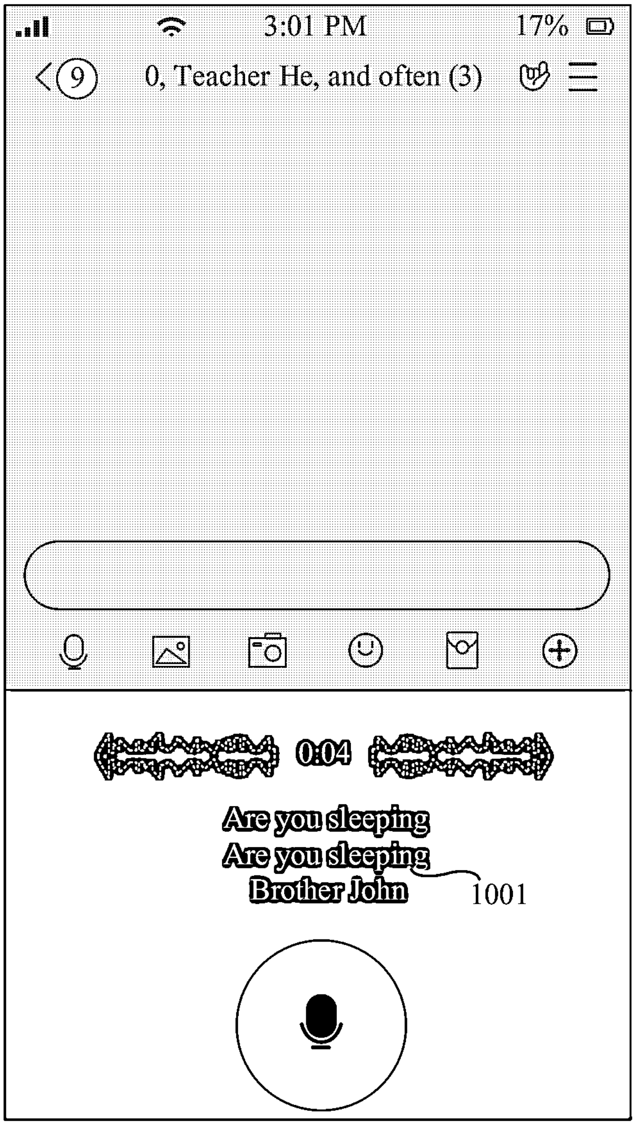
FIG. 10 is a schematic diagram of a session interface according to an embodiment of this application.

For example, FIG. 10 is a schematic diagram of a session interface according to an embodiment of this application. Referring to FIG. 10, a corresponding lyric 1001 is presented in the song recording interface. Therefore, when a user forgets the lyric, the user may be prompted.

Herein, when a recorded song is matched with a song in a song library according to lyrics of the recorded song, voice recognition is performed on the recorded song by using a voice recognition interface, to convert the recorded song into a text, and then the text is matched with the lyrics of the song in the song library.

In some embodiments, the song may be recorded in the following manners: obtaining a song recording background image corresponding to the reverberation effect; using the song recording background image as a background of the song recording interface, and presenting a song recording button in the song recording interface; recording the song in response to a press operation for the song recording button; and finishing recording the song when the press operation is stopped, to obtain the recorded song.

During actual implementation, each reverberation effect corresponds to a song recording background image. After a reverberation effect is selected, a corresponding song recording background image is used as a background of the song recording interface.

Figure 11:
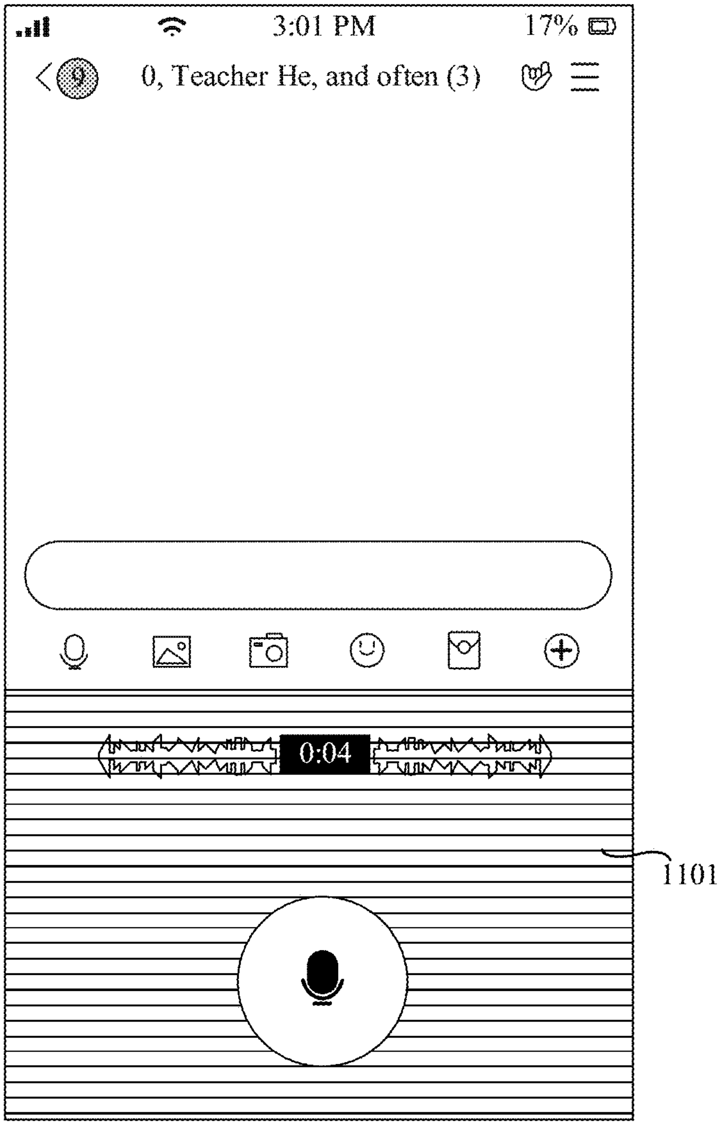
FIG. 11 is a schematic diagram of a session interface according to an embodiment of this application.

During actual application, the song recording background image corresponding to the reverberation effect may be a background image of a corresponding reverberation effect. For example, FIG. 11 is a schematic diagram of a session interface according to an embodiment of this application. When the selected reverberation effect is KTV, referring to FIG. 7 and FIG. 11, a background 1101 of the song recording interface in FIG. 11 is the same as a background of a reverberation effect corresponding to KTV in FIG. 7.

Step 303: Transmit, in response to a song transmitting instruction, a target song obtained by processing the song based on the reverberation effect to members of the group chat session, and present a session message corresponding to the target song in the session interface.

During actual implementation, the recorded song is processed based on the reverberation effect to optimize the recorded song, to obtain a target song. Then the target song is transmitted by using a session window, and a session message corresponding to the target song is presented in the session interface. Herein, after the target song is transmitted by using the session window, a client of another member participating in a session also presents the session message corresponding to the target song in the session interface.

Figure 12A:
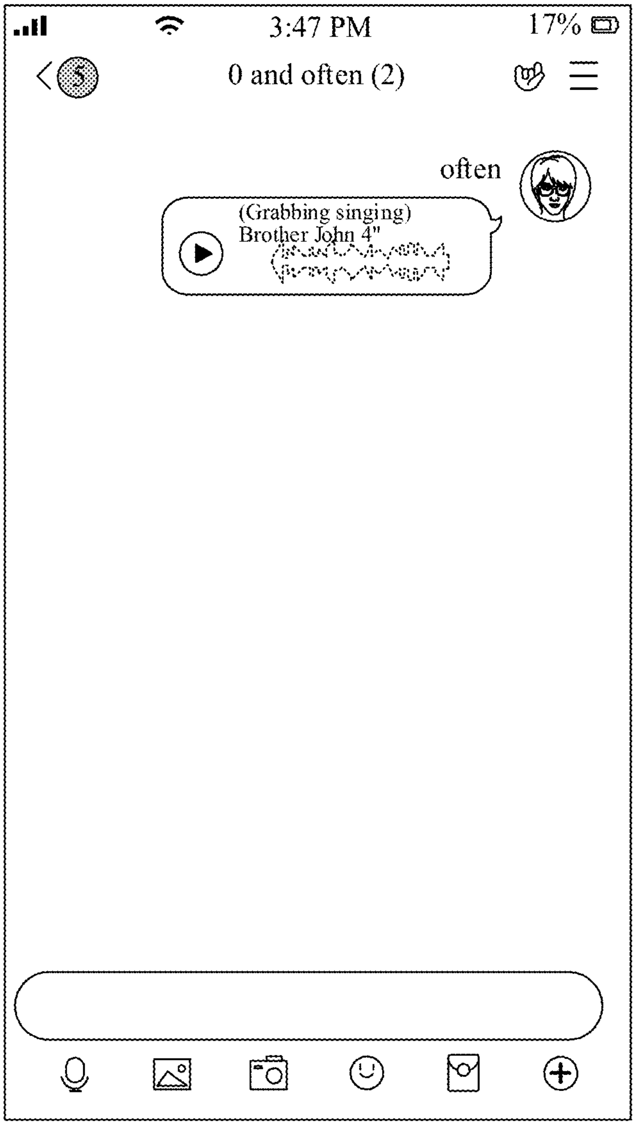
FIG. 12A is a schematic diagram of a session interface corresponding to a current user according to an embodiment of this application.
Figure 12B:
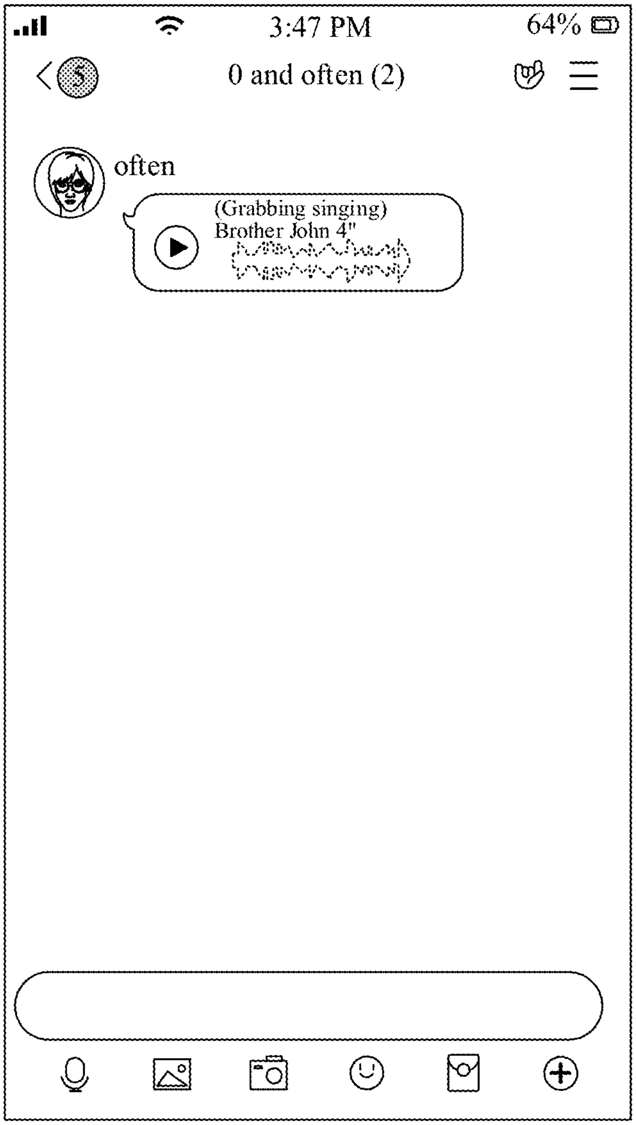
FIG. 12B is a schematic diagram of a session interface corresponding to another user participating in a session according to an embodiment of this application.

For example, FIG. 12A is a schematic diagram of a session interface corresponding to a current user according to an embodiment of this application. FIG. 12B is a schematic diagram of a session interface corresponding to another user participating in a session according to an embodiment of this application. Referring to FIG. 12A and FIG. 12B, a session message corresponding to a target song is presented in a message box of a session interface.

Figure 13:
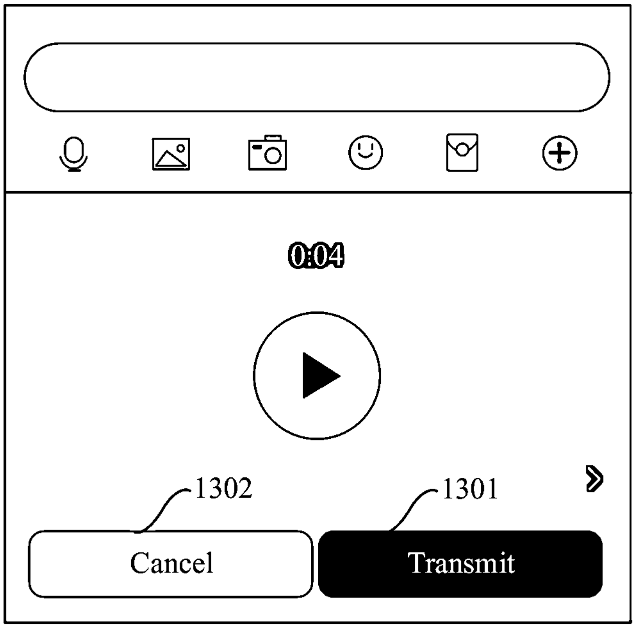
FIG. 13 is a schematic diagram of a determining interface according to an embodiment of this application.

During actual application, after recording is completed, the terminal presents a confirmation interface, and the user may trigger a song transmitting instruction based on the confirmation interface. For example, FIG. 13 is a schematic diagram of a confirmation interface according to an embodiment of this application. Referring to FIG. 13, a confirmation interface includes a transmitting button 1301 and a cancel button 1302. When a user clicks/taps the transmitting button 1301, the song transmitting instruction is triggered, and the target song is transmitted by using the session window. When the user clicks the cancel button 1302, the target song is deleted.

In some embodiments, the session message corresponding to the target song may be presented in the following manners: matching the target song with a song in a song library, to obtain a matching result; determining, when the matching result represents that there is a song matching the target song, song information of the target song according to the song matching the target song; and presenting the session message that carries the song information and corresponds to the target song in the session interface.

During actual implementation, the target song may be matched with a song in a song library according to at least one of a melody or lyrics of the target song. When there is a song matching the target song, song information is obtained. The song information herein includes at least one of the following: a name, lyrics, a melody, or a poster. For example, referring to FIG. 12A, the session message includes a name of a song "Brother John".

In some embodiments, the session message corresponding to the target song may be presented in the following manners: obtaining a bubble style corresponding to the reverberation effect; determining, according to a duration of the target song, a bubble length matching the duration; and presenting, based on the bubble style and the bubble length, the session message corresponding to the target song by using a bubble card.

During actual implementation, the session message corresponding to the target song may be presented by using a bubble card. Each reverberation effect corresponds to a bubble style. A bubble style corresponding to a selected reverberation effect may be determined. For example, a background of the bubble card may be the same as a background of a corresponding reverberation effect.

Figure 14:
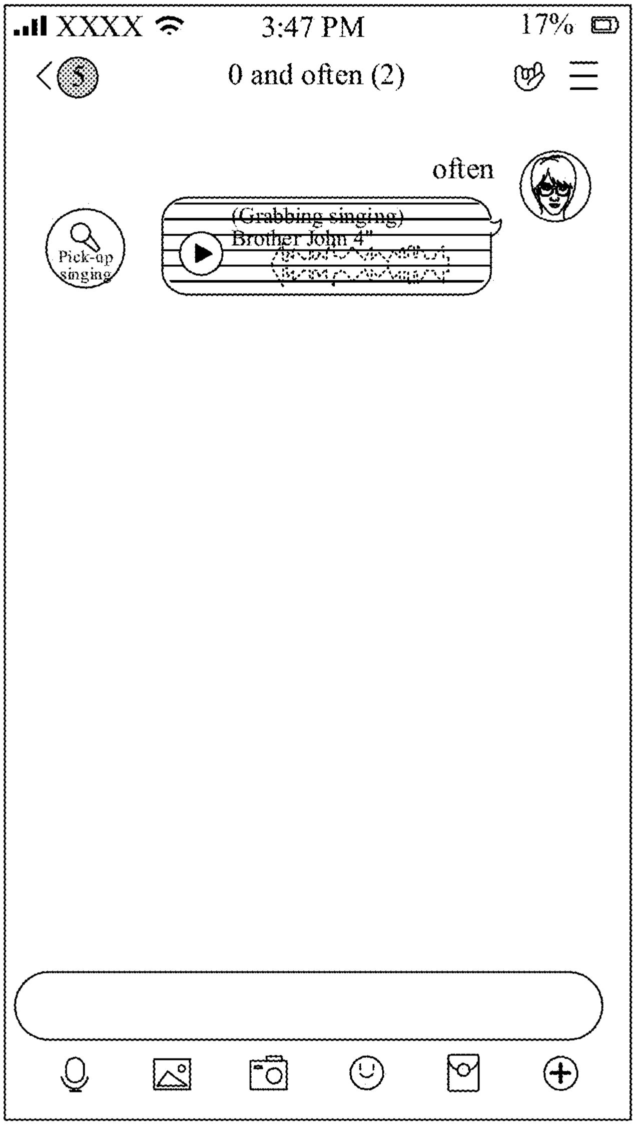
FIG. 14 is a schematic diagram of a session interface according to an embodiment of this application.

For example, FIG. 14 is a schematic diagram of a session interface according to an embodiment of this application. Referring to FIG. 7 and FIG. 14, when the reverberation effect is the KTV, a bubble background for carrying the session message in FIG. 14 is the same as the background of the reverberation effect corresponding to the KTV in FIG. 7.

During actual implementation, a bubble length is related to a duration of the target song. When the duration is less than a duration threshold (for example, 2 minutes), a longer duration indicates a longer corresponding bubble length. When the duration is greater than the duration threshold, the bubble length is a fixed value such as 80% of a screen width.

Figure 15:
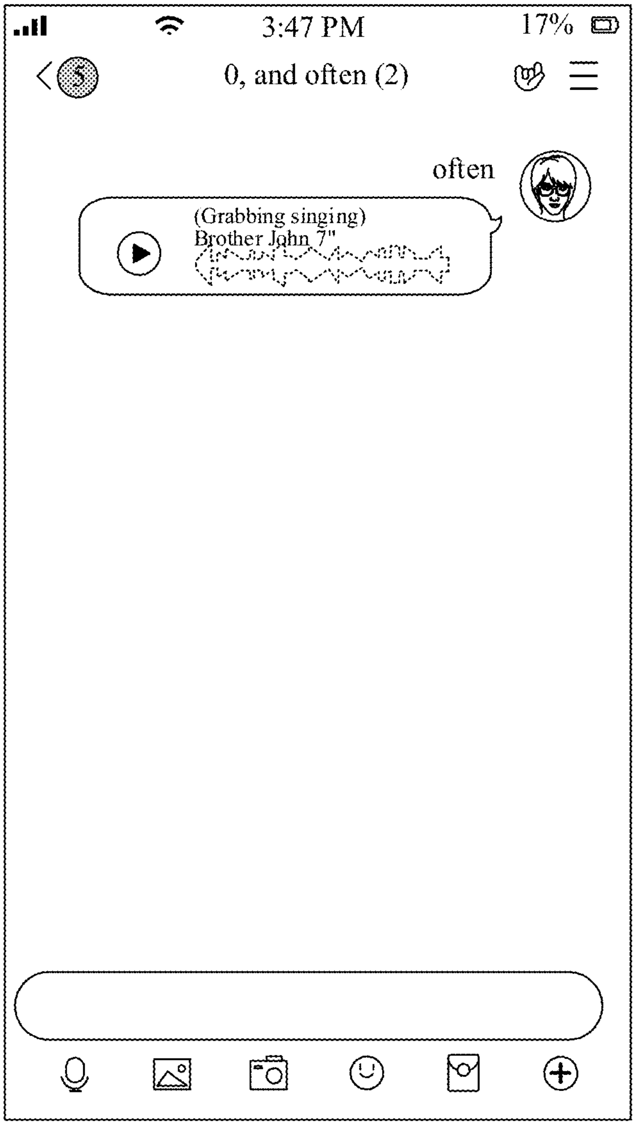
FIG. 15 is a schematic diagram of a session interface according to an embodiment of this application.

For example, FIG. 15 is a schematic diagram of a session interface according to an embodiment of this application. Referring to FIG. 12A and FIG. 15. A duration of the target song corresponding to the session message in FIG. 12A is 4 s. A duration of the target song corresponding to the session message in FIG. 15 is 7 s. a bubble length in FIG. 15 is greater than a bubble length in FIG. 12A.

In some embodiments, the session message corresponding to the target song may be presented in the following manners: obtaining a song poster corresponding to the target song; and using the song poster as a background of a message card of the session message, and presenting the session message corresponding to the target song in the session interface by using the message card.

Herein, the session message may further be presented in the form of a message card. During actual implementation, the target song may be matched with the song in the song library according to at least one of the melody or the lyrics of the target song. When there is a song matching the target song, a song poster corresponding to the matched song is obtained, and the song poster is used as a song poster corresponding to the target song.

In some embodiments, when the target song is a song episode, the terminal also presents a pick-up singing function item corresponding to the target song in the session interface. The pick-up singing function item is used for implementing pick-up singing of the target song by a session member in the session window.

During actual implementation, a pick-up singing function is provided, that is, after the session message corresponding to the target song is presented, a corresponding pick-up singing function item may further be presented in the session interface, to perform pick-up singing on the target song.

Figure 16:
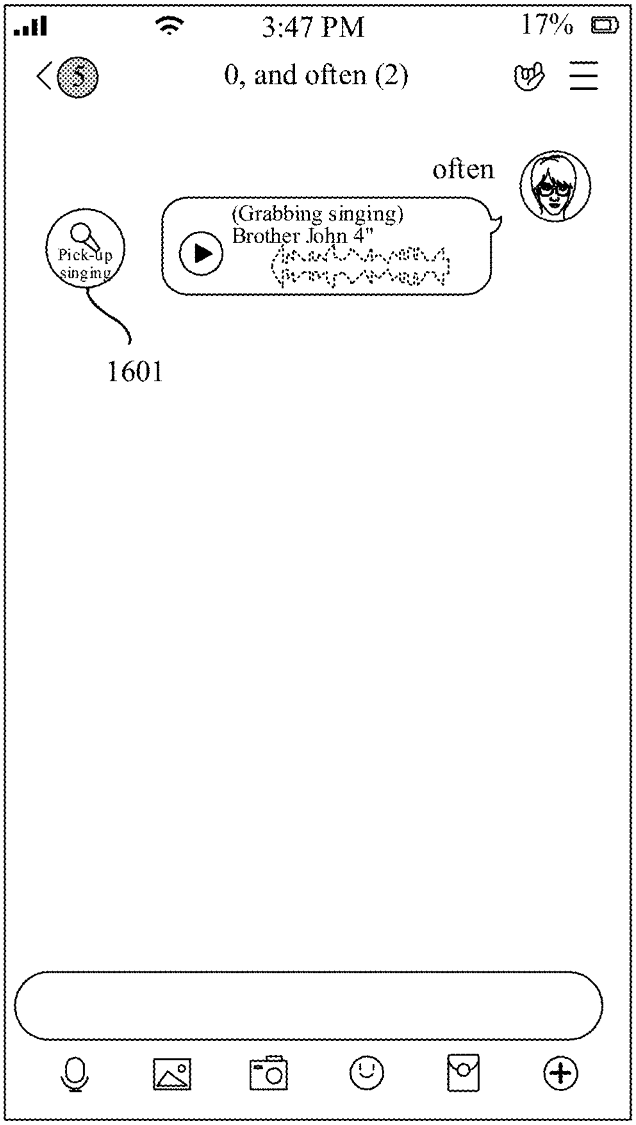
FIG. 16 is a schematic diagram of a session interface according to an embodiment of this application.

For example, FIG. 16 is a schematic diagram of a session interface according to an embodiment of this application. Referring to FIG. 16, a pick-up singing function item 1601 corresponding to the target song is presented near the session message corresponding to the target song.

During actual application, when receiving a trigger operation for the pick-up singing function item, the terminal presents a recording interface of a pick-up song, so that the user may record the pick-up song for the target song by using the recording interface of the pick-up song, thereby implementing pick-up singing of the target song by the session member in the session window.

Herein, the recording interface of the pick-up song may be presented in a full-screen form; or may be directly presented in the session interface; or may be presented in a form of a floating window, that is, the recording interface of the pick-up song is floated on the session interface. The floating window herein may be transparent, semi-transparent, or completely opaque. The recording interface of the pick-up song may be presented in another form. This is not limited herein.

Figure 17A:
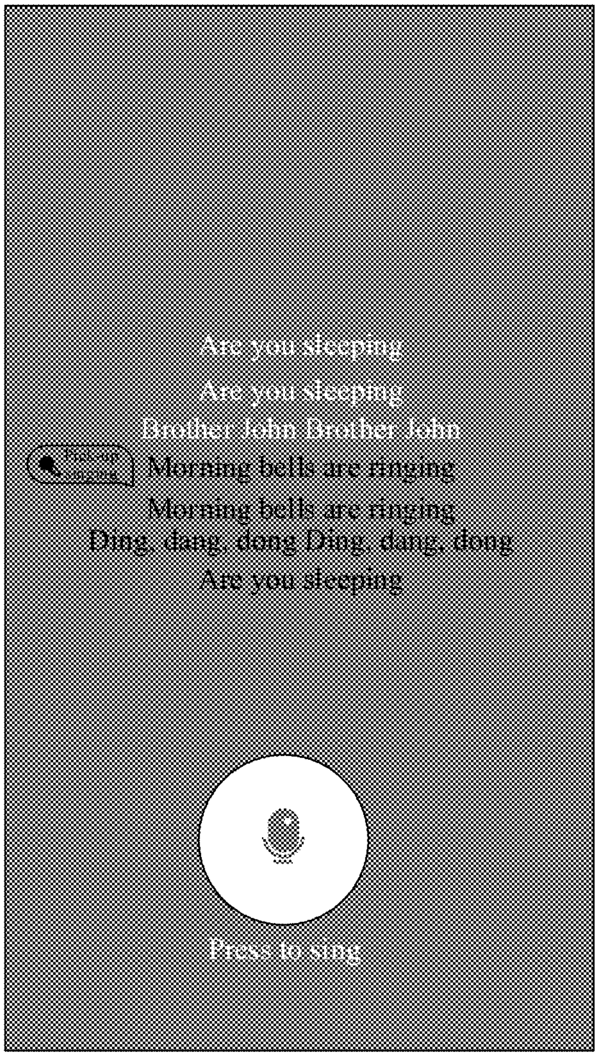
FIG. 17A to FIG. 17C are schematic diagrams of recording interfaces of a pick-up song according to an embodiment of this application.
Figure 17B:
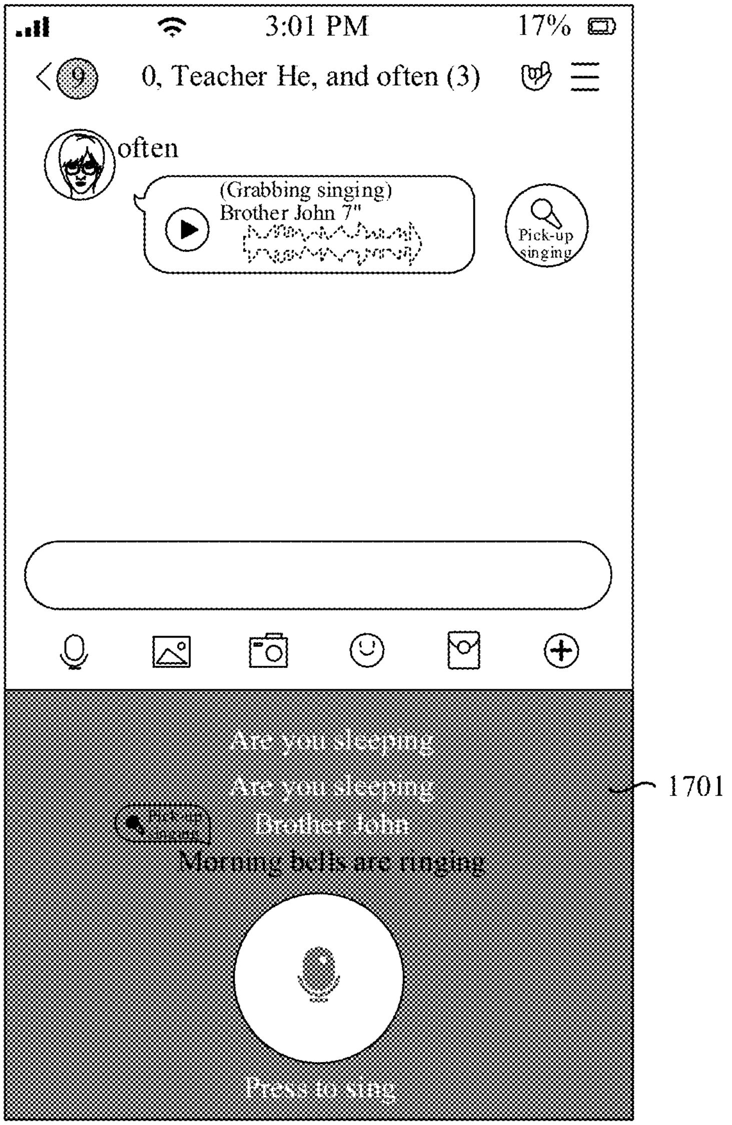
Figure 17C:
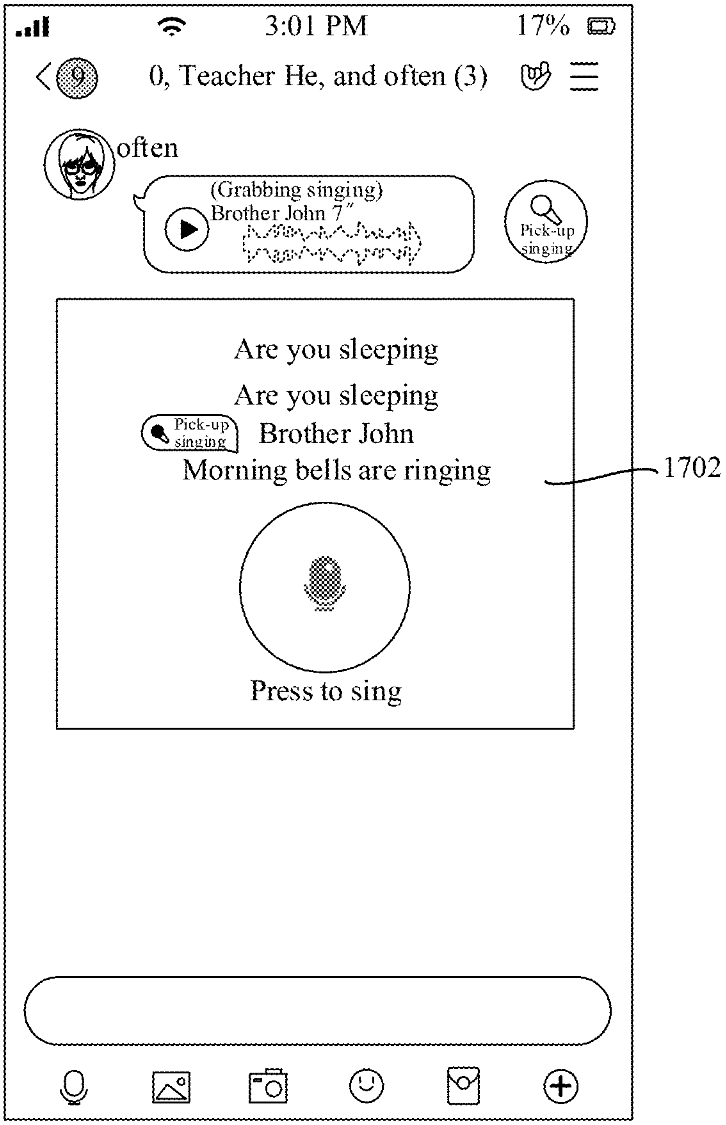

Exemplarily, FIG. 17A to FIG. 17C are schematic diagrams of a recording interface of a pick-up song according to an embodiment of this application. Referring to FIG. 17A, a recording interface of a pick-up song is presented in a full screen form. Referring to FIG. 17B, the session toolbar moves upward. A recording interface 1701 of the pick-up song is presented below the session toolbar. Referring to FIG. 17C, a recording interface 1702 of the pick-up song is presented in the session interface in the form of a transparent floating window.

In some embodiments, the terminal presents a recording interface of a pick-up song in response to a trigger operation for the pick-up singing function item; obtains lyric information of a song corresponding to the song episode; and presents, according to the lyric information, lyrics corresponding to the song episode and lyrics of a pick-up singing part in the recording interface of the pick-up song.

During actual implementation, if there is a song in the song library corresponding to the target song, corresponding lyric information is obtained, and lyrics of a song episode and lyrics of a pick-up singing part are presented in the recording interface of the pick-up song. Herein, when the lyrics of the song episode and the lyrics of the pick-up singing part are presented, only some lyrics may be presented, or all the lyrics may be presented.

Figure 18:
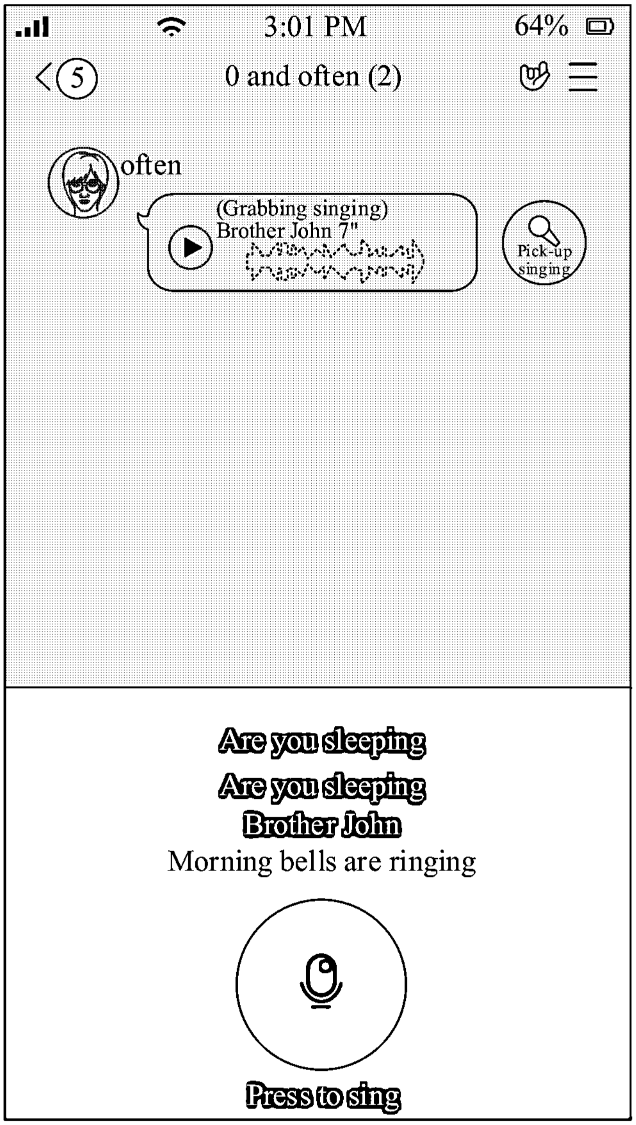
FIG. 18 is a schematic diagram of a session interface according to an embodiment of this application.

For example, only lyrics of last few sentences of the song episode may be presented. FIG. 18 is a schematic diagram of a session interface according to an embodiment of this application. Referring to FIG. 18, the last four lines of lyrics of a song episode are presented.

In some embodiments, the terminal may further present a recording interface of a pick-up song in response to a trigger operation for the pick-up singing function item; obtain a melody of a song corresponding to the song episode; and play at least a part of the melody of the song episode.

During actual implementation, after the recording interface of the pick-up song is presented, a part of a melody of the song episode may be played automatically. For example, a melody corresponding to the last four lines of lyrics of the song episode may be played. If the song episode is relatively short, for example, the melody corresponding to the last four lines of lyrics needs to be played, and when a quantity of lyrics corresponding to the song episode is less than four sentences, the melody of the entire song episode may be played.

Herein, the at least a part of the melody of the song episode may be played in a loop playback manner.

In this embodiment of this application, a problem that the user cannot remember the melody and cannot perform pick-up singing is avoided by playing the at least a part of the melody of the song episode.

In some embodiments, the terminal may further receive a song recording instruction during playing of the at least a part of the melody; stop playing the at least a part of the melody, and play a melody of a pick-up singing part, in response to the song recording instruction; and record a song based on the played melody, to obtain a recorded pick-up song.

During actual implementation, by playing a melody of a pick-up singing part, a better pick-up singing environment is provided for the user, thereby improving user experience. During playing of the melody, the melody may be played after being processed by using the selected reverberation effect.

In some embodiments, the terminal may further obtain lyric information of a song corresponding to the song episode; and scrollably display corresponding lyrics with playing of the melody of the pick-up singing part during recording of the pick-up song.

Herein, with playing of the melody of the pick-up singing part, the corresponding lyrics are scrollably displayed according to a speed of the song, causing the lyrics presented in a target region to correspond to the played melody. For example, lyrics in a penultimate line in a lyric display region may correspond to the played melody.

In some embodiments, after presenting the pick-up singing function item corresponding to the target song, the terminal may further present a recording interface of a pick-up song in response to a trigger operation for the pick-up singing function item; obtain the pick-up song recorded based on the recording interface of the pick-up song; and process the pick-up song by using the reverberation effect of the song episode as a reverberation effect of the pick-up song.

During actual implementation, a reverberation effect selected by the last user is selected by default to process a recorded song.

Figure 19:
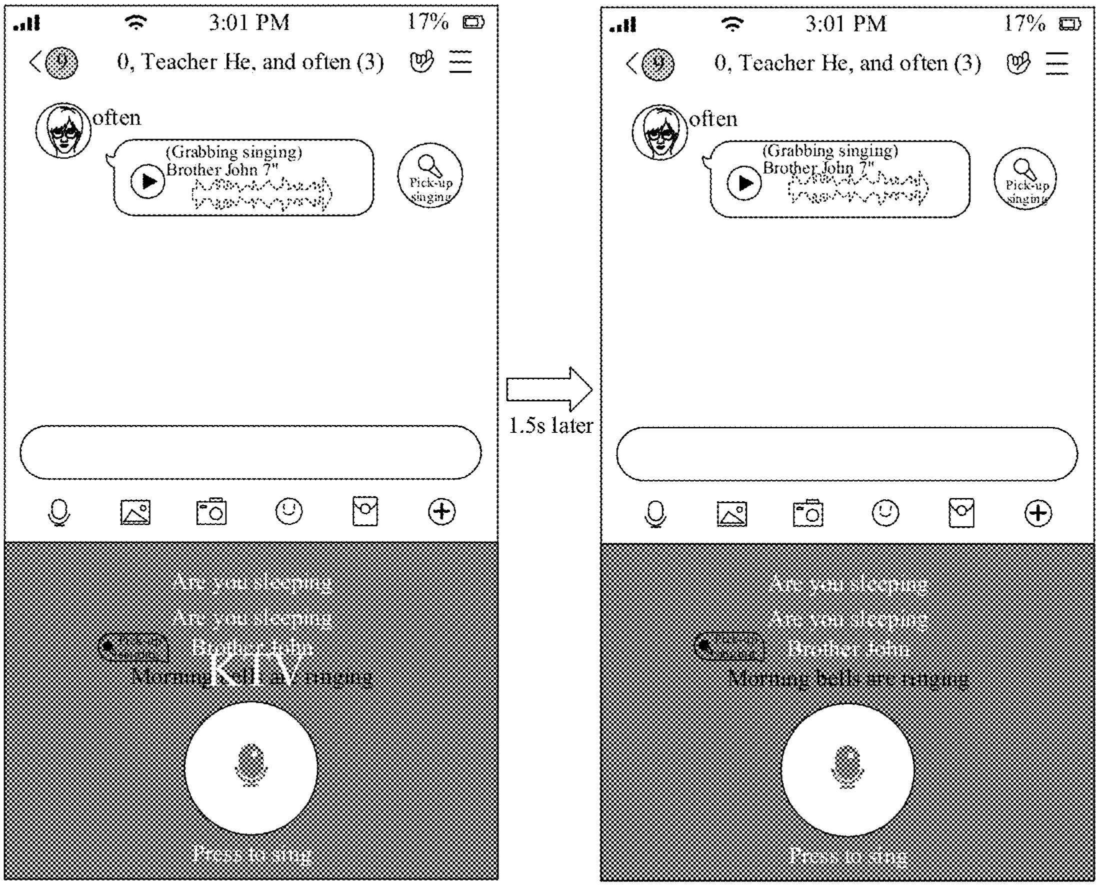
FIG. 19 is a schematic diagram of a user interface according to an embodiment of this application.

In some embodiments, the reverberation effect may also be switched. The user may perform a left-and-right slide operation based on the presented recording interface of the pick-up song. The terminal switches the reverberation effect according to an interactive operation of the user. After the reverberation effect is switched, prompt information corresponding to the switched reverberation effect is presented. For example, FIG. 19 is a schematic diagram of a session interface according to an embodiment of this application. Referring to FIG. 19, when the reverberation effect is switched to the KTV, prompt information "KTV" is presented in the recording interface, to prompt the user that the reverberation effect is switched to the "KTV". The prompt information herein disappears automatically after a preset time. For example, the prompt information may disappear after 1.5 s.

In some embodiments, after presenting the pick-up singing function item corresponding to the target song, the terminal may further present a recording interface of a pick-up song in response to a trigger operation for the pick-up singing function item; determine, when the pick-up song is obtained based on the recording interface of the pick-up song, a position of the recorded pick-up song in the song corresponding to the song episode, the position being used as a start position of pick-up singing; and transmit a session message that carries the position and corresponds to the pick-up song, and present the session message of the pick-up song in the session interface, the session message of the pick-up song indicating the start position of pick-up singing.

During actual implementation, when a pick-up song is recorded, a position of the recorded pick-up song in the song corresponding to the song episode is recorded, and a session message including information about the position and corresponding to the pick-up song is presented, to prompt a next user to perform pick-up singing from this position.

Figure 20:
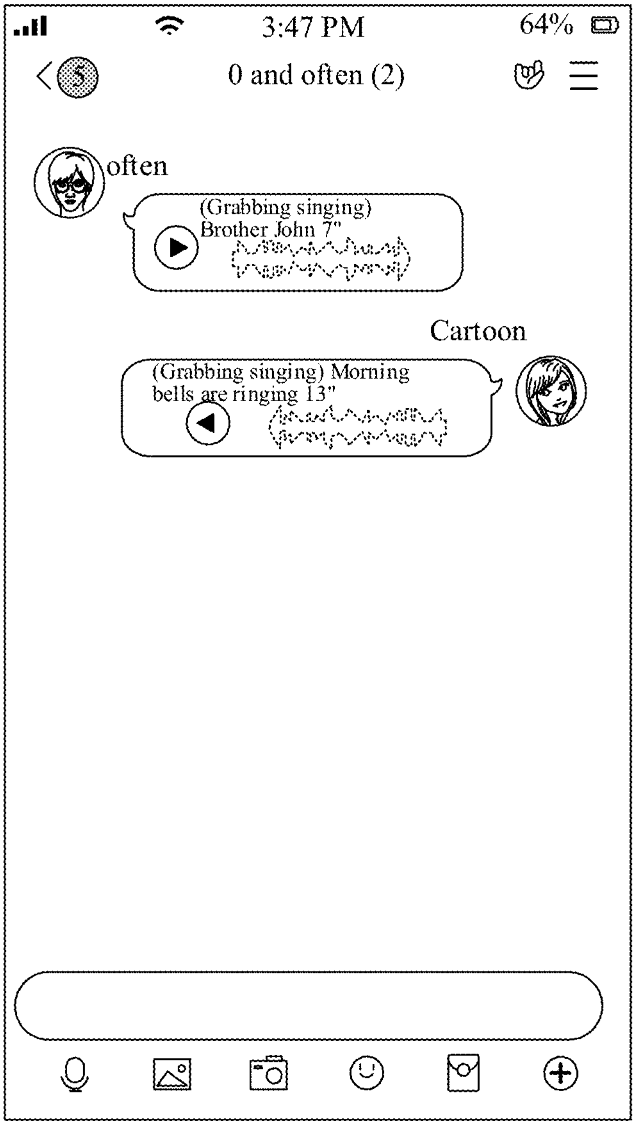
FIG. 20 is a schematic diagram of a user interface according to an embodiment of this application.

For example, FIG. 20 is a schematic diagram of a user interface according to an embodiment of this application. Referring to FIG. 20, lyrics corresponding to a start position of pick-up singing is presented in the session message of the pick-up song.

In some embodiments, after presenting the pick-up singing function item corresponding to the target song, the terminal may further present a recording interface of a pick-up song in response to a trigger operation for the pick-up singing function item; and present prompt information when it is determined that the pick-up song recorded based on the recording interface of the pick-up song includes no human voice. The prompt information is used for prompting that the recorded pick-up song includes no human voice.

Figure 21:
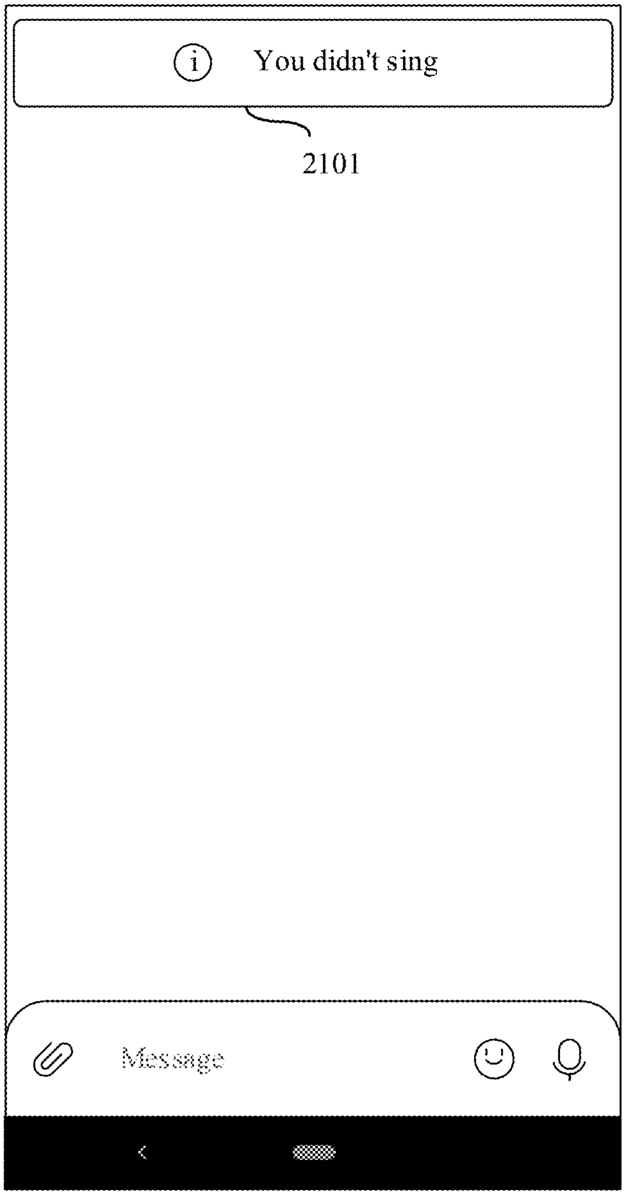
FIG. 21 is a schematic diagram of a bubble prompt according to an embodiment of this application.

During actual implementation, if there is no singing voice of anyone in a recorded pick-up song, prompt information is presented after recording is completed, to prompt that the recorded pick-up song includes no singing voice of people. For example, the prompt information may be "You didn't sing". The prompt information may be presented by using a bubble prompt. FIG. 21 is a schematic diagram of a bubble prompt according to an embodiment of this application. The prompt information "You didn't sing" is presented by using a bubble 2101 prompt.

In some embodiments, after the prompt information is presented, the recorded pick-up song may be automatically deleted.

In some embodiments, the terminal may further present, when the session interface is a group chat session interface, at least two pick-up singing modes in the group chat session interface; and determine, in response to a pick-up singing mode selection instruction triggered for a target pick-up singing mode, a selected pick-up singing mode as a target pick-up singing mode, the pick-up singing mode being used for indicating a session member having a pick-up singing permission. The pick-up singing function item corresponding to the target song may be presented in the following manners: presenting, when it is determined that there is the pick-up singing permission according to the target pick-up singing mode, the pick-up singing function item corresponding to the target song.

During actual implementation, only when a current user has a pick-up singing permission, the pick-up singing function item corresponding to the target song is presented. An initiator of the pick-up singing, that is, a user recording the target song, may select a pick-up singing mode before transmitting the target song, to indicate a session member having the pick-up singing permission.

Figure 22:
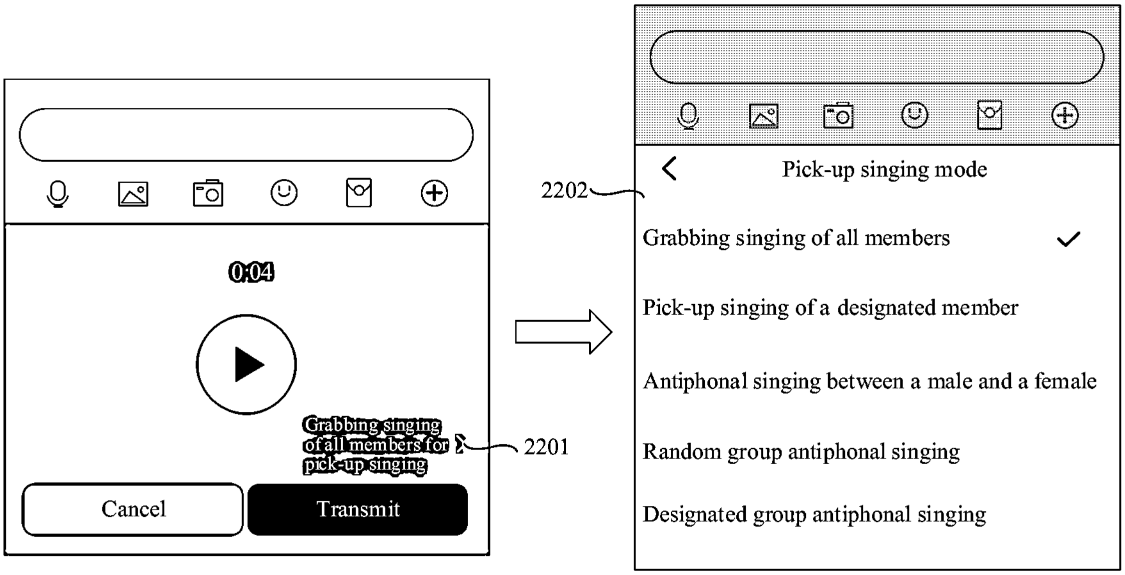
FIG. 22 is a schematic diagram of an interface of selection of a pick-up singing mode according to an embodiment of this application.

For example, FIG. 22 is a schematic diagram of an interface of selection of a pick-up singing mode according to an embodiment of this application. Referring to FIG. 22, a pick-up singing mode selection function item 2201 is further presented in the confirmation interface. After a click/tap operation of a user on the selection function item, the pick-up singing mode selection interface 2202 is presented. Five pick-up singing modes are presented in the pick-up singing mode selection interface, including: grabbing singing of all members, pick-up singing of a designated member, antiphonal singing between a male and a female, antiphonal singing in a random group, and antiphonal singing in a designated group.

Herein, when the pick-up singing mode is the grabbing singing of all members, all members participating in a session have the pick-up singing permission.

When the pick-up singing mode is the pick-up singing of the designated member, it is determined whether a current user is a designated pick-up singing member. If the current user is the designated member of pick-up singing, the current user has the pick-up singing permission. Otherwise, the current user does not have the pick-up singing permission. Herein, when the pick-up singing mode is selected, if the selected pick-up singing mode is the pick-up singing of a designated member, a selection interface of a pick-up singer is presented, so that the user designates a pick-up singing member based on the interface.

Figure 23:
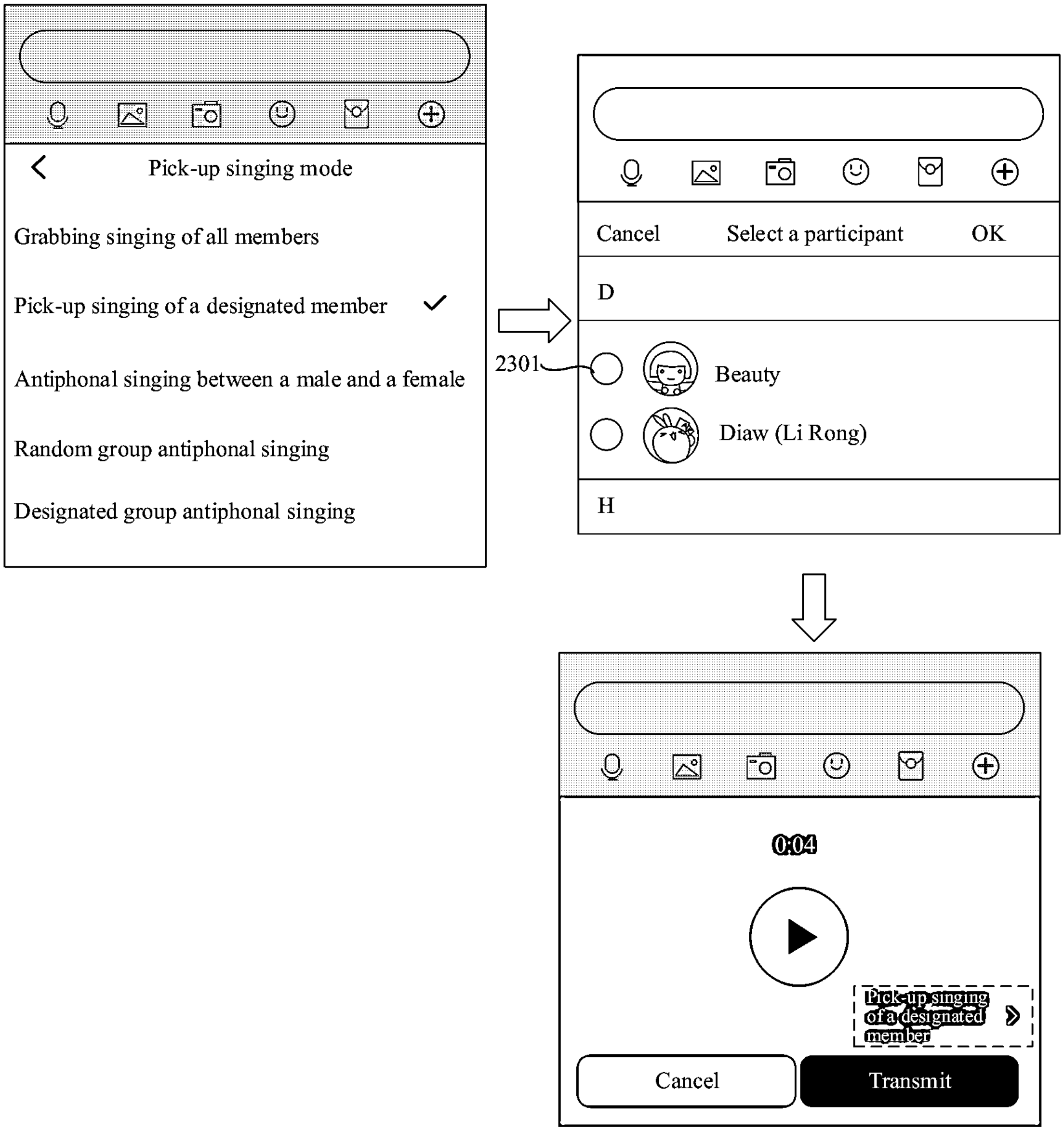
FIG. 23 is a schematic diagram of a selection interface of a singer participating in pick-up singing according to an embodiment of this application.

For example, FIG. 23 is a schematic diagram of a selection interface of a singer participating in pick-up singing according to an embodiment of this application. Referring to FIG. 23, the selected pick-up singing mode is the pick-up singing of the designated member. All selectable member information (such as a profile picture of the user and a user name) is presented, and a member participating in pick-up singing is selected by clicking/tapping an option 2301 corresponding to the corresponding member. After "OK" is clicked/tapped, it is determined that the pick-up signing mode of the designated member is switched. After the switching is completed, the confirmation page is jumped back, and the selected pick-up singing mode, that is, the pick-up singing of the designated member, is presented in the confirmation page.

When the pick-up singing member is selected, one or more members may be selected.

When the pick-up singing mode is the antiphonal singing between the male and the female, gender of a singer of the target song is determined. If the singer of the target song is a male, and only when the current user is a female, the current user is qualified to perform pick-up singing. If the singer of the target song is a female, and only when the current user is a male, the current user is qualified to perform pick-up singing.

Figure 24:
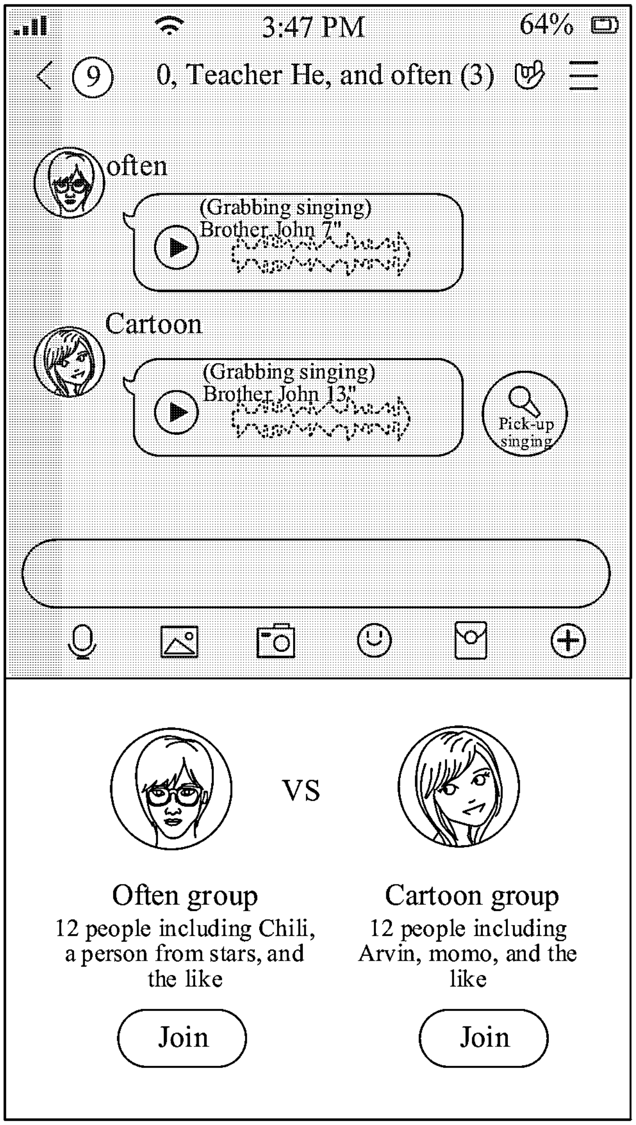
FIG. 24 is a schematic diagram of a group selection interface according to an embodiment of this application.

When the pick-up singing mode is the antiphonal singing in the random group, everyone is qualified to perform pick-up singing. After a first pick-up singing member transmits a pick-up song, subsequent members participating in pick-up singing may choose to join a group of the initiator, or join a group of the first pick-up singing member. FIG. 24 is a schematic diagram of a group selection interface according to an embodiment of this application. Referring to FIG. 24, a group selection interface is presented. Profile pictures, group information (for example, a quantity of users joining a group and user information), and a join button corresponding to each group of the initiator and the first pick-up singing member are presented in the interface, and a corresponding group is joined by clicking/tapping the join button. A member who is qualified to perform pick-up singing and a member transmitting a corresponding session message are to be in different groups.

Figure 25:
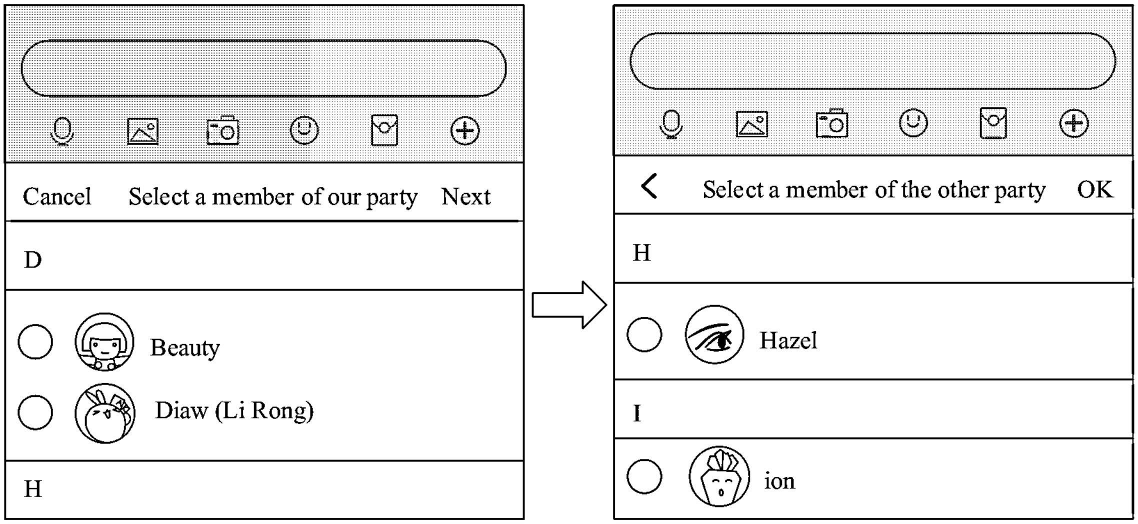
FIG. 25 is a schematic diagram of a group member selection interface according to an embodiment of this application.

When the pick-up singing mode is the antiphonal singing in the designated group, and when the pick-up singing mode is selected, members of two parties need to be selected. When the current user is a member of the two parties, and when it is the turn of the group in which the current user is located to perform pick-up singing, it is determined that the current user is qualified to perform pick-up singing. When the initiator selects members of two parties, FIG. 25 is a schematic diagram of a group member selection interface according to an embodiment of this application. Referring to FIG. 25, a selection interface of selecting a group member of our party is first presented, and information (for example, profile pictures of users and user names) about all members of a group in which our party is located is presented. Selection is performed by clicking/tapping an option corresponding to a corresponding member. After the selection is completed, a next step is clicked/tapped. A selection interface of selecting a group member of the other party is presented, and information about other members than the group members of our party in a group in which the other party is located is presented. Similarly, the selection is performed by clicking/tapping an option corresponding to a corresponding member.

The pick-up singing mode is not limited to the pick-up singing mode shown in FIG. 22, and may further include: pick-up singing of a designated member in order, pick-up singing of members in a group in a designated order, pick-up singing of a randomly assigned member, and pick-up singing of a randomly assigned member in a group.

In some embodiments, after presenting the pick-up singing function item corresponding to the target song, the terminal may further receive a trigger operation corresponding to the pick-up singing function item when the target pick-up singing mode is a grabbing singing mode; present a recording interface of a pick-up song when it is determined that the trigger operation corresponding to the pick-up singing function item is a first received trigger operation corresponding to the pick-up singing function item; and present prompt information used for prompting that a grabbing singing permission is not obtained, when it is determined that the trigger operation corresponding to the pick-up singing function item has been received before the trigger operation corresponding to the pick-up singing function item.

The grabbing singing mode herein includes all-member grabbing singing mode, a designated-member grabbing singing mode, and the like, that is, the grabbing singing mode may be used provided that a plurality of members have the pick-up singing permission.

During actual implementation, a first member who clicks/taps the pick-up singing function item corresponding to the target song is determined as a member having a grabbing singing permission. Only when the member has the grabbing singing permission, the recording interface of the pick-up song is presented, and prompt information prompting that the grabbing singing permission is obtained may be presented in the recording interface of the pick-up song. Otherwise, prompt information is presented, to prompt that the user does not obtain the grabbing singing permission.

In some embodiments, after presenting the pick-up singing function item corresponding to the target song, the terminal may further obtain the pick-up song recorded based on the pick-up singing function item, when the target pick-up singing mode is a grabbing singing mode; receive a transmitting instruction for the pick-up song; transmit the pick-up song, when it is determined that the transmitting instruction is a first received pick-up song transmitting instruction for the song episode; and present prompt information used for prompting that a grabbing singing permission is not obtained, when it is determined that the transmitting instruction of the pick-up song for the song episode has been received before the transmitting instruction is received.

During actual implementation, a first member triggering a pick-up song transmitting instruction for the song episode is determined as a member having a grabbing singing permission. Only when the current user has the grabbing singing permission, the terminal can successfully transmit the pick-up song. Otherwise, the terminal fails to transmit the pick-up song, and presents corresponding prompt information, to prompt that the user does not obtain the grabbing singing permission.

In some embodiments, after presenting the pick-up singing function item corresponding to the target song, the terminal may further obtain antiphonal singing roles when the target pick-up singing mode is a group antiphonal singing mode; receive a trigger operation for the pick-up singing function item; present a recording interface of a pick-up song when it is determined that a pick-up singing time corresponding to the antiphonal singing roles arrives and in response to the trigger operation for the pick-up singing function item; and present prompt information used for prompting that the pick-up singing time does not arrive, when it is determined that the pick-up singing time corresponding to the antiphonal singing roles does not arrive.

During actual implementation, when a group antiphonal singing mode is used, different antiphonal singing roles may be assigned to each group. Only when a pick-up singing time of the antiphonal singing role arrives, members of a corresponding group are qualified to perform pick-up singing and can successfully enter the recording interface of the pick-up song. If the pick-up singing time of the antiphonal singing roles does not arrive, corresponding prompt information is presented to prompt that the pick-up singing time does not arrive.

In some embodiments, after presenting the pick-up singing function item corresponding to the target song, the terminal may further receive a session message of a pick-up song corresponding to the song episode; and present the session message of the pick-up song corresponding to the song episode, and cancel the presented pick-up singing function item.

During actual implementation, when another user transmits a pick-up song corresponding to the song episode, the terminal receives a session message of the pick-up song corresponding to the song episode; and presents the session message of the pick-up song corresponding to the song episode, and cancels the presented pick-up singing function item. Herein, if the current user has a pick-up singing permission corresponding to the pick-up song, a pick-up singing function item corresponding to the pick-up song is presented.

Figure 26:
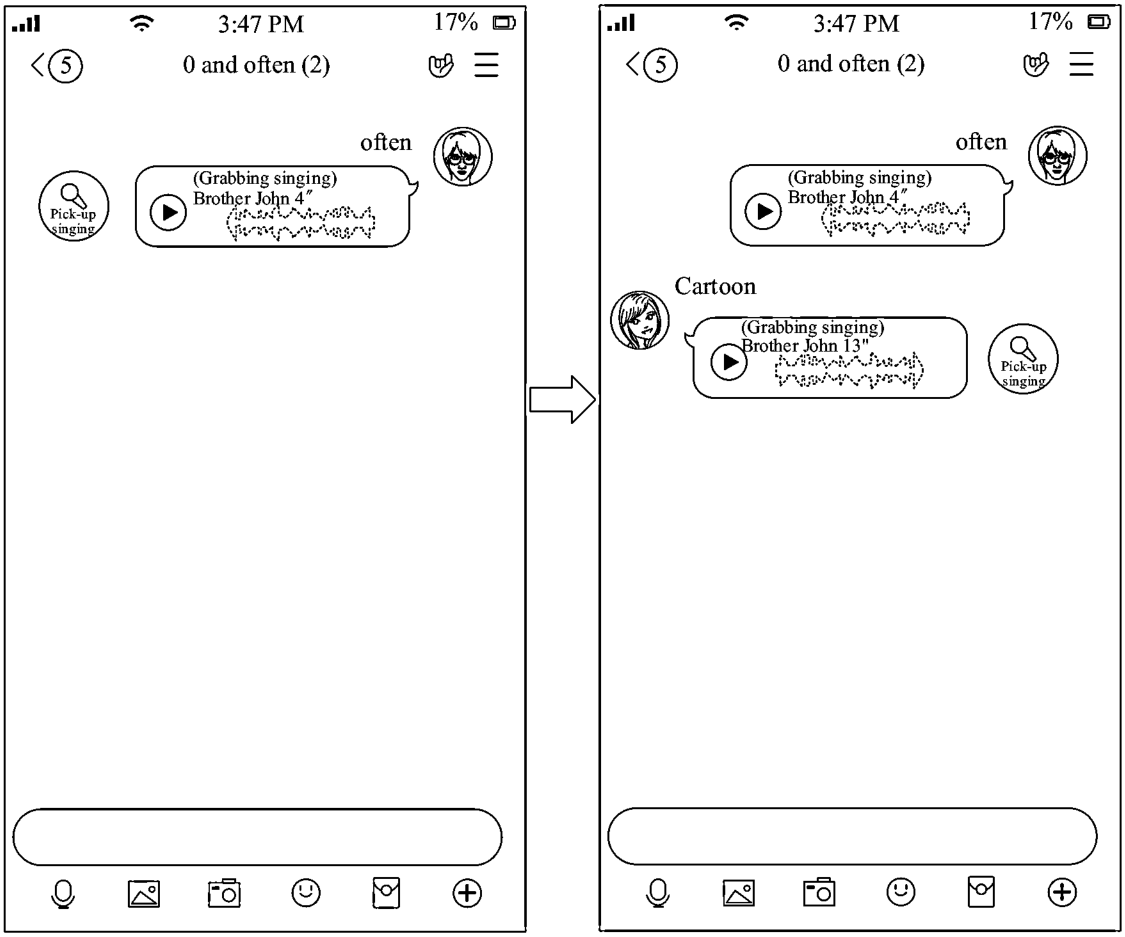
FIG. 26 is a schematic diagram of a session interface according to an embodiment of this application.

For example, FIG. 26 is a schematic diagram of a session interface according to an embodiment of this application. Referring to FIG. 26, first, a session message corresponding to a target song and a corresponding pick-up singing function item are presented in the session interface. If a session message of a pick-up song corresponding to a song episode is received at this time, when it is determined that a pick-up singing permission corresponding to the pick-up song is achieved, a pick-up singing function item corresponding to the pick-up song is presented, and presentation of the pick-up singing function item corresponding to the target song is canceled.

In some embodiments, after presenting the pick-up singing function item corresponding to the target song, the terminal may further receive and present a session message corresponding to a pick-up song, the session message carrying prompt information indicating that pick-up singing is completed; and present a details page in response to a viewing operation for the prompt information, the details page being used for sequentially playing, when a trigger operation of playing a song is received, a song recorded by a session member participating in pick-up singing in an order of participating in pick-up singing.

During actual implementation, when the pick-up singing is completed, and when presenting the session message corresponding to the pick-up song, the terminal presents prompt information indicating that the pick-up singing is completed. The prompt information may include information about a user participating in pick-up singing, song information, and the like. Herein, when a relatively large quantity of people participates in the pick-up singing, user information of only some participants is presented. The prompt information may further include a viewing button, so that when a trigger operation for the viewing button is received, the details page is presented.

Figure 27:
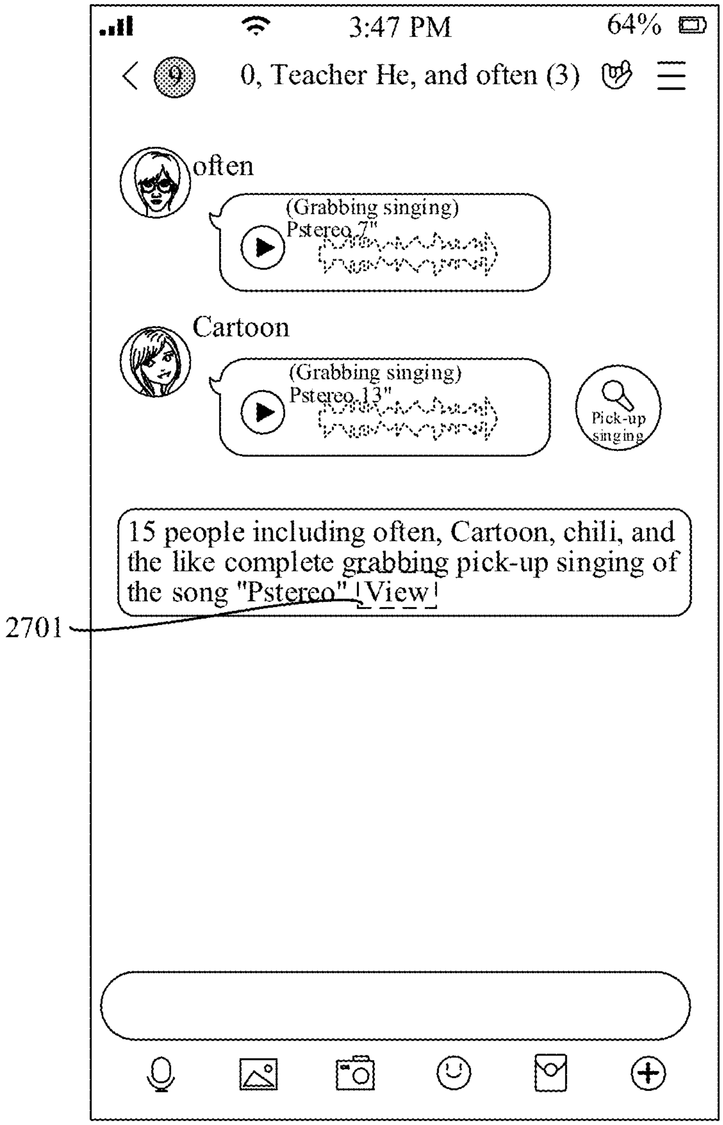
FIG. 27 is a schematic diagram of a session interface according to an embodiment of this application.

For example, FIG. 27 is a schematic diagram of a session interface according to an embodiment of this application. Referring to FIG. 27, after the session message corresponding to the pick-up song is presented, prompt information is presented below the session message. When the prompt information is presented, a viewing button 2701 corresponding to the prompt information is presented. The user clicks/taps the viewing button corresponding to the prompt information to present a details page.

FIG. 28 is prompt information corresponding to each pick-up singing mode according to an embodiment of this application. Referring to FIG. 28, for different pick-up singing modes, different prompts may be presented.

In some embodiments, the terminal may further present at least one of lyrics of the song recorded by the session member participating in pick-up singing or a user profile picture of the session member participating in pick-up singing in the details page.

During actual implementation, when there is a song matching the target song in the song library, song information corresponding to the target song may be obtained and presented in the details page. In addition, the details page further includes a playback button, used for playing, when a click/tap operation for the playback button is received, the song recorded by the session member participating in pick-up singing in a pick-up singing order. Moreover, during playback, a pause button is presented to pause the playback, and a playback progress bar is displayed simultaneously. An operation such as dragging for fast-forward or dragging for fast-rewind may be performed by using the playback progress bar.

Figure 29:
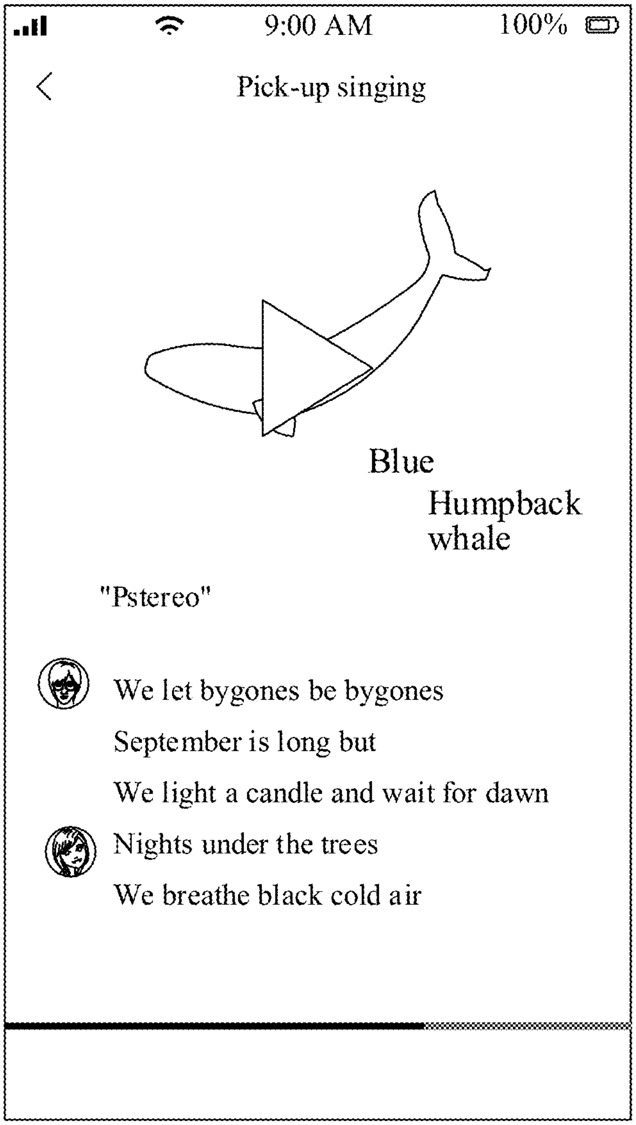
FIG. 29 is a schematic diagram of an interface of a details page according to an embodiment of this application.

For example, FIG. 29 is a schematic diagram of an interface of a details page according to an embodiment of this application. Referring to FIG. 29, song information, a playback button, and a playback progress bar are presented in the details page. The song information includes a song poster, a song name, lyrics, and the like. Moreover, according to a part sung by each user, a user profile picture of a singer is presented near lyrics.

Figure 30:
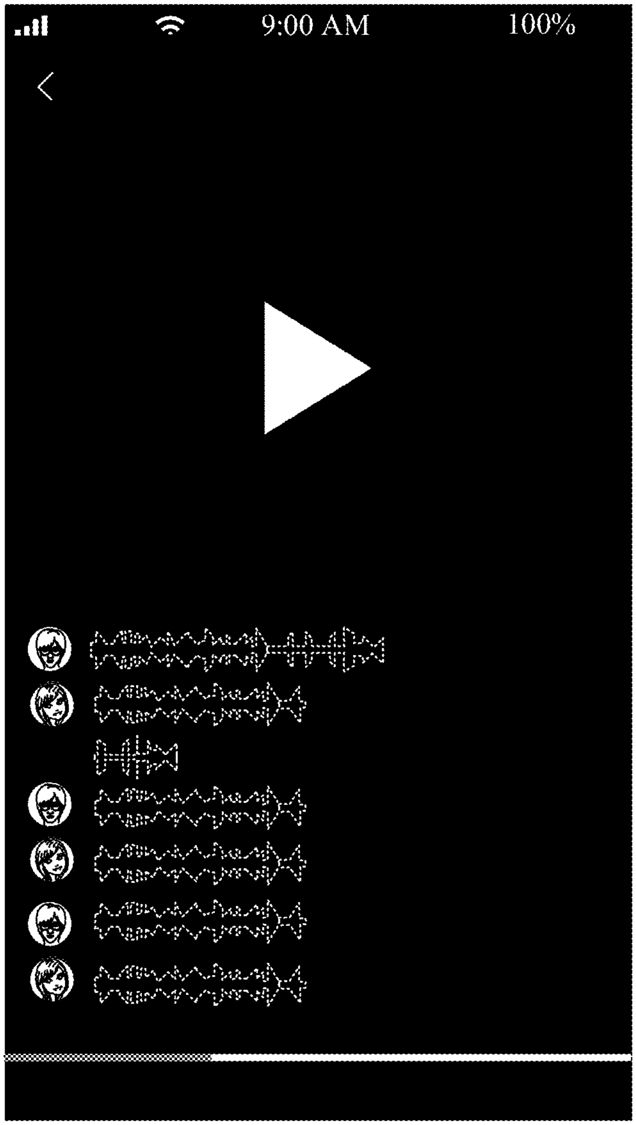
FIG. 30 is a schematic diagram of an interface of a details page according to an embodiment of this application.

In some embodiments, when there is no song matching the target song in the song library, the song information cannot be presented in the details page. FIG. 30 is a schematic diagram of an interface of a details page according to an embodiment of this application. Referring to FIG. 30, a profile picture and a corresponding sound wave of each singer are presented in the details page in a pick-up singing order. During playing, a song recorded by each singer is played in the pick-up singing order.

In some embodiments, the terminal may further present a sharing function button for the details page in the details page. The sharing function button is used for sharing a completed pick-up song.

Figure 31:
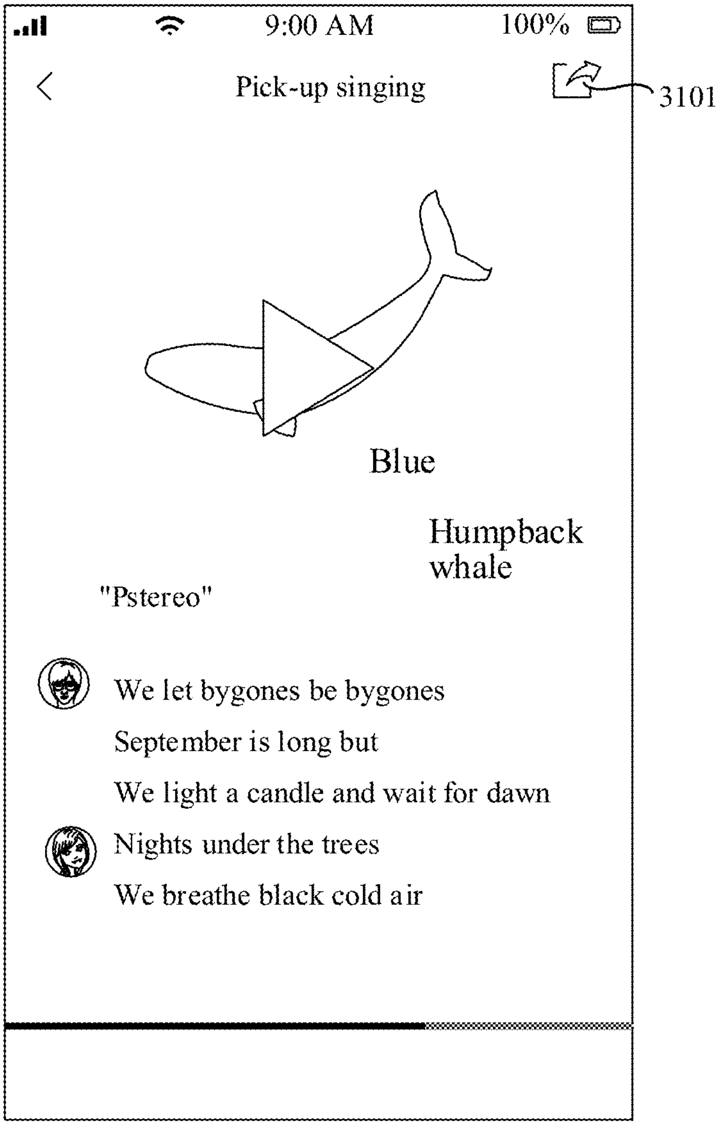
FIG. 31 is a schematic diagram of an interface of a details page according to an embodiment of this application.

For example, FIG. 31 is a schematic diagram of an interface of a details page according to an embodiment of this application. Referring to FIG. 31, a sharing function button 3101 is presented in an upper right corner of the details page, for sharing a completed pick-up song.

In some embodiments, the terminal may further receive a trigger operation for the sharing function button; and transmit, when it is determined that a corresponding sharing permission is available, a link corresponding to the completed pick-up song, in response to the trigger operation for the sharing function button.

During actual implementation, a user clicks/taps a sharing function button. The terminal determines whether the current user has a sharing permission. If the current user has the sharing permission, a friend selection page is presented. A friend is selected from the friend selection page. A link corresponding to a completed pick-up song is transmitted to a terminal of the selected friend. The sharing permission is preset. For example, only a member participating in pick-up singing may be set to have the sharing permission.

Figure 32:
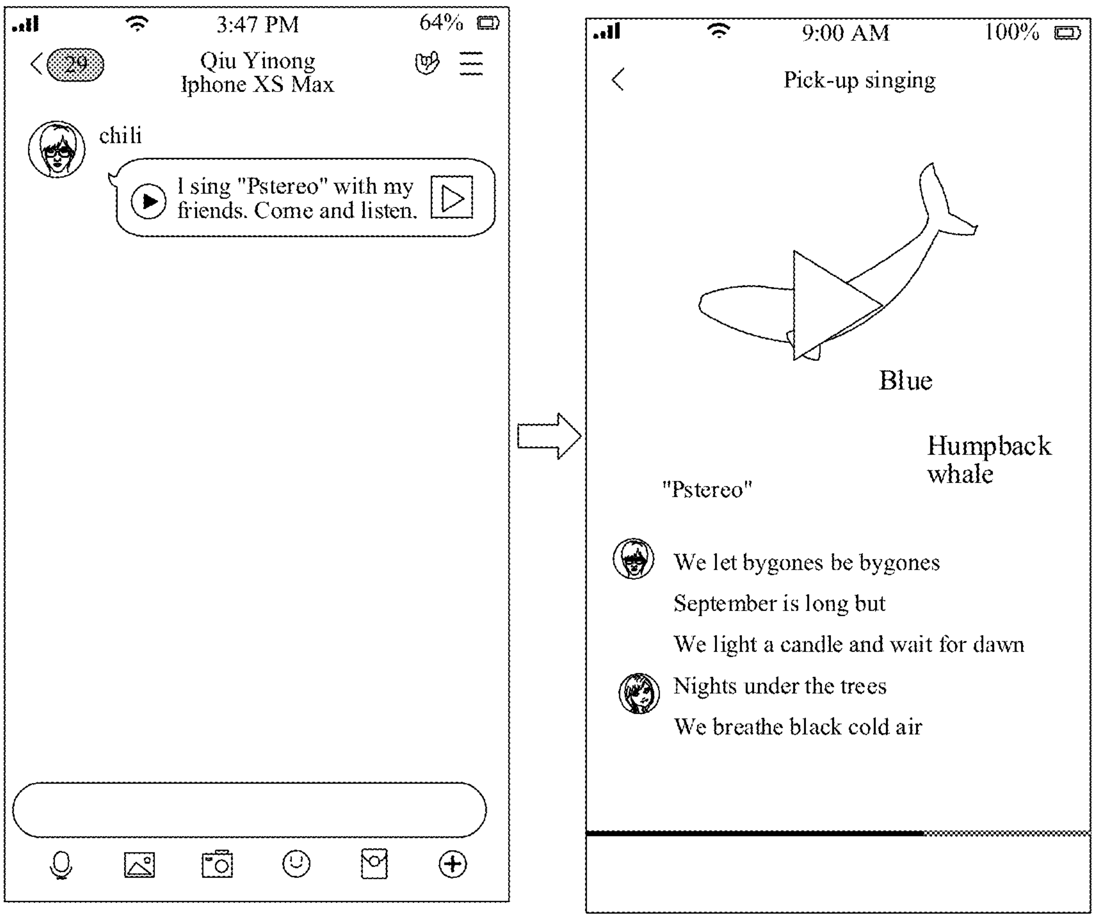
FIG. 32 is a schematic diagram of a session interface according to an embodiment of this application.

Herein, after the user receives the link corresponding to the completed pick-up song, a session message of the link corresponding to the completed pick-up song is presented in a corresponding session interface. The session message may be presented in a form of a message card or the like. For example, FIG. 32 is a schematic diagram of a session interface according to an embodiment of this application. Referring to FIG. 32, a session message of a link corresponding to a completed pick-up song is presented in the session interface. After a click/tap operation for the session message is received, the details page is presented.

In some embodiments, after presenting the pick-up singing function item corresponding to the target song, the terminal may further present a chorus function item corresponding to the target song. The chorus function item is used for presenting a recording interface of a chorus song, when a trigger operation for the chorus function item is received, to record a song the same as the target song based on the recording interface of the chorus song.

During actual implementation, a chorus function may be provided, that is, a chorus function button is presented when the session message corresponding to the target song is presented. A chorus instruction is triggered by using a click/tap operation for the chorus function button. The chorus instruction may also be triggered in other manners, for example, double-clicking/tapping a session message, and sliding a session message. After the chorus instruction is received, a recording interface of a chorus song is presented. The chorus song is recorded based on the recording interface of the chorus song. Content of the recorded song is to be the same as that of the target song. After the chorus is completed, the recorded song is synthesized with the target song.

The recording interface of the chorus song may be presented in a full-screen form. Lyrics and information about users participating in the chorus may be presented in the recording interface of the chorus song.

Moreover, after the chorus is finished, each member participating in the chorus may be scored. A ranking of scores may be presented, or a highest scorer may be given a title that may be used for displaying.

In this embodiment of this application, a song recording interface is presented in response to a singing instruction triggered in a session interface; a song is recorded in response to a song recording instruction triggered in the song recording interface, to obtain a recorded song; a reverberation effect corresponding to the recorded song is determined; and a target song obtained by processing the song based on the reverberation effect corresponding to the recorded song is transmitted in response to a song transmitting instruction. Therefore, in an application scenario of a social session, a reverberation effect can be added to a recorded song, the recorded song may be beautified, to improve user experience, thereby increasing frequencies of using a social application to record and transmit a song by a user.

Figure 33:
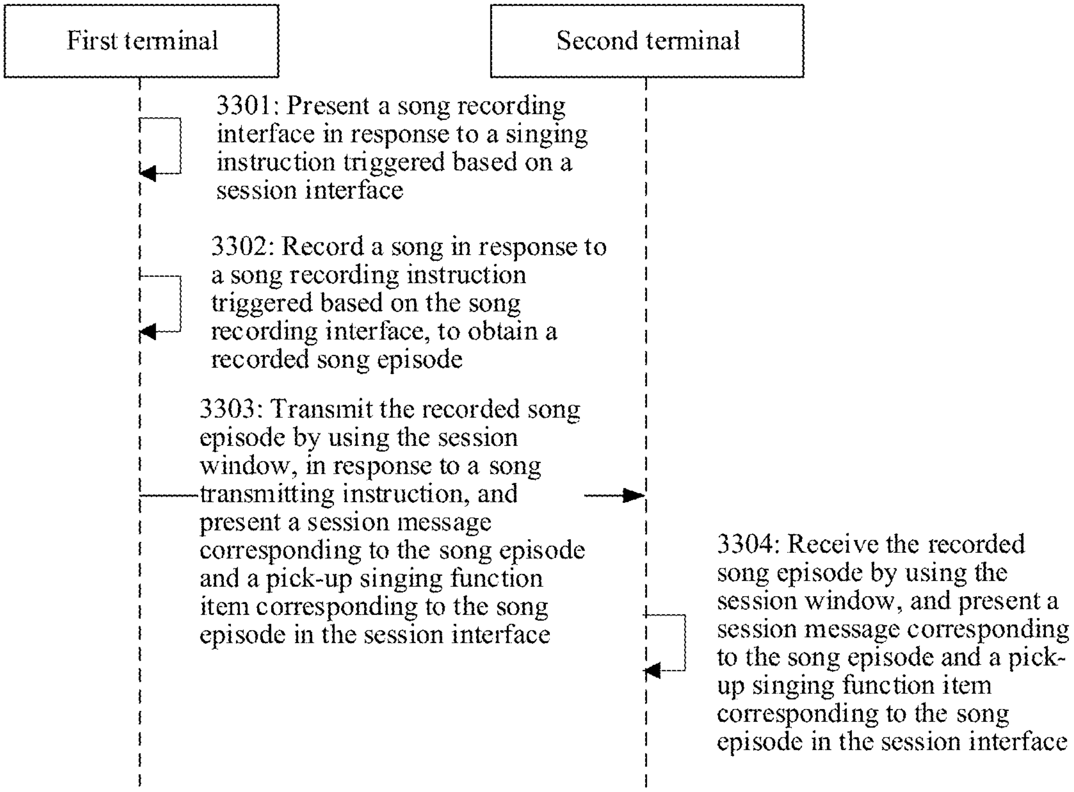
FIG. 33 is a schematic flowchart of a song processing method according to an embodiment of this application.

FIG. 33 is a schematic flowchart of a song processing method according to an embodiment of this application. Referring to FIG. 33, the song processing method provided in this embodiment of this application is implemented by a first terminal and a second terminal collaboratively. The first terminal is an initiator of pick-up singing, and the second terminal is a pick-up singing terminal. The song processing method provided in this embodiment of this application includes:

Step 3301: A first terminal presents a song recording interface in response to a singing instruction triggered in a session interface.

During actual implementation, an instant messaging client is installed on the first terminal. The session interface is presented by using the instant messaging client. A user may communicate with another user by using the session interface. In a process that the user communicates with the another user by using the session interface, if the user needs to record and transmit a song, a singing instruction may be triggered by using the session interface. After receiving the singing instruction, the terminal may present a song recording interface.

In some embodiments, the singing instruction may be triggered in the following manners: presenting the session interface, and presenting a voice function item in the session interface; presenting at least two voice modes in response to a trigger operation on the voice function item; and receiving a selection operation for a voice mode as a singing mode, and triggering the singing instruction.

Herein, during actual application, the voice function item is a native function item of the instant messaging client, which is natively embedded in the instant messaging client without using a third-party application or a third-party control. By running the instant messaging client and presenting the session interface, the user may see the voice function item presented in the session interface instead of being floated on the session interface.

During actual implementation, a session toolbar is presented in the session interface, and the voice function item is presented in the session toolbar. After the trigger operation on the voice function item is received, a voice panel is presented, and the at least two voice modes are presented in the voice panel. The at least two voice modes may be presented in another manner. For example, a pop-up window is presented and the at least two voice modes are presented in the pop-up window. The at least two voice modes include at least the singing mode. After the selection operation for the song mode option is received, the singing instruction is triggered.

In some embodiments, the singing instruction may be triggered in the following manners: presenting the session interface, and presenting a singing function item in the session interface; and triggering the singing instruction in response to a trigger operation for the singing function item.

During actual application, a singing function item is a native function item of the instant messaging client, which is natively embedded in the instant messaging client without using a third-party application or a third-party control. By running the instant messaging client and presenting the session interface, the user may see the singing function item presented in the session interface instead of being floated on the session interface.

During actual implementation, the singing function item may be directly presented in the session toolbar, to trigger the singing instruction based on the singing function item, thereby simplifying an operation of the user.

Step 3302: The first terminal records a song in response to a song recording instruction triggered in the song recording interface, to obtain a recorded song episode.

Herein, a song episode in a song is obtained.

In some embodiments, the terminal presents a song recording button in the song recording interface; records the song in response to a press operation for the song recording button; and finishes recording the song when the press operation is stopped, to obtain a recorded song episode.

During actual implementation, when a press operation for a recording button is received, the terminal invokes an audio collector such as a microphone to record a song, and store the recorded song in a cache. Moreover, during recording, a sound wave may be presented in the song recording interface to represent that the sound is received. A recorded duration may further be presented.

In some embodiments, after the song recording button is clicked/tapped, the song may be recorded. When the song recording button is clicked/tapped again, recording of the song is finished, to obtain a recorded song episode.

In some embodiments, the song may be recorded in the following manners: presenting a song recording button in the song recording interface; recording the song, in response to a press operation for the song recording button, and recognizing the recorded song during recording; presenting corresponding song information in the song recording interface when a corresponding song is recognized; and finishing recording the song when the press operation is stopped, to obtain a recorded song episode.

During actual implementation, the recorded song episode may be recognized during recording, that is, the recorded song episode is matched with a song in a music library according to at least one of a melody or lyrics of the recorded song episode. When there is a song matching the recorded song episode in the music library, song information of the matched song is obtained, and the corresponding song information is presented in the song recording interface. The song information herein may include lyrics, a poster, a song name, and the like.

In some embodiments, the terminal may determine a reverberation effect corresponding to the recorded song episode, to process the recorded song episode based on the determined reverberation effect.

In some embodiments, a song recording background image corresponding to the reverberation effect may be obtained; the song recording background image is used as a background of the song recording interface, and a song recording button is presented in the song recording interface; the song is recorded in response to a press operation for the song recording button; and recording of the song is finished when the press operation is stopped, to obtain a recorded song episode.

During actual implementation, each reverberation effect corresponds to a song recording background image. After a reverberation effect is selected, a corresponding song recording background image is used as a background of the song recording interface.

Step 3303: The first terminal transmits the recorded song episode by using the session window in response to a song transmitting instruction, and presents a session message corresponding to the song episode and a pick-up singing function item corresponding to the song episode in the session interface.

The pick-up singing function item is used for implementing pick-up singing of the target song by a session member in the session window.

Step 3304: The second terminal receives the recorded song episode by using the session window, and presents a session message corresponding to the song episode and a pick-up singing function item corresponding to the song episode in the session interface.

The pick-up singing function item is used for implementing pick-up singing of the target song. The second terminal herein is a pick-up singing terminal. The first terminal may alternatively be used as the pick-up singing terminal, and the second terminal may alternatively be used as an initiator.

During actual implementation, the second terminal presents a recording interface of a pick-up song in response to a trigger operation for a pick-up singing function item, to record the pick-up song corresponding to a song episode based on the recording interface, thereby implementing pick-up singing of the target song.

Herein, the recording interface of the pick-up song may be presented in a full-screen form; or may be directly presented in the session interface; or may be presented in a form of a floating window, that is, the recording interface of the pick-up song is floated on the session interface. The recording interface of the pick-up song may also be presented in another form. This is not limited herein.

In some embodiments, the terminal presents a recording interface of a pick-up song in response to a trigger operation for the pick-up singing function item; obtains lyric information of a song corresponding to the song episode; and presents, according to the lyric information, lyrics corresponding to the song episode and lyrics of a pick-up singing part in the recording interface of the pick-up song.

During actual implementation, if there is a song corresponding to the song episode in a song library, corresponding lyric information is obtained, and lyrics of the song episode and lyrics of a pick-up singing part are presented in the recording interface of the pick-up song. Herein, when the lyrics of the song episode and the lyrics of the pick-up singing part are presented, only some lyrics may be presented, or all the lyrics may be presented.

In some embodiments, the terminal may further present a recording interface of a pick-up song in response to a trigger operation for the pick-up singing function item; obtain a melody of a song corresponding to the song episode; and play at least a part of the melody of the song episode.

During actual implementation, after the recording interface of the pick-up song is presented, a part of a melody of the song episode may be played automatically. Herein, the at least a part of the melody of the song episode may be played in a loop playback manner.

In some embodiments, the terminal may further receive a song recording instruction during playing of the at least a part of the melody; stop playing the at least a part of the melody, and play a melody of a pick-up singing part, in response to the song recording instruction; and record a song based on the played melody, to obtain a recorded pick-up song.

During actual implementation, by playing the melody of the pick-up singing part, a better pick-up singing environment is provided for the user, thereby improving user experience. During playing of the melody, the melody may be played after being processed by using the selected reverberation effect In some embodiments, the terminal may further obtain lyric information of a song corresponding to the song episode; and scrollably display corresponding lyrics with playing of the melody of the pick-up singing part during recording of the pick-up song.

Herein, with playing of the melody of the pick-up singing part, the corresponding lyrics are scrollably displayed according to a speed of the song, causing the lyric presented in a target region to correspond to the played melody.

In some embodiments, after presenting the pick-up singing function item corresponding to the target song, the terminal may further present a recording interface of a pick-up song in response to a trigger operation for the pick-up singing function item; and present prompt information when it is determined that the pick-up song recorded based on the recording interface of the pick-up song includes no human voice. The prompt information is used for prompting that the recorded pick-up song includes no human voice.

During actual implementation, if there is no singing voice of anyone in a recorded pick-up song, prompt information is presented after recording is completed, to prompt that the recorded pick-up song includes no singing voice of people. For example, the prompt information may be "You didn't sing".

In some embodiments, after the prompt information is presented, the recorded pick-up song may be automatically deleted.

In some embodiments, a user of the first terminal may select a pick-up singing mode, to determine a target pick-up singing mode.

In some embodiments, after presenting the pick-up singing function item corresponding to the song episode, the terminal may further obtain a pick-up song recorded based on the pick-up singing function item, when the target pick-up singing mode is a grabbing singing mode; receive a transmitting instruction for the pick-up song; transmit the pick-up song when it is determined that the transmitting instruction is a first received pick-up song transmitting instruction for the song episode, and present prompt information used for prompting that a grabbing singing permission is not obtained, when it is determined that the pick-up song transmitting instruction for the song episode has been received before the transmitting instruction is received.

In some embodiments, after presenting the pick-up singing function item corresponding to the target song, the terminal may further obtain antiphonal singing roles when the target pick-up singing mode is a group antiphonal singing mode; receive a trigger operation for the pick-up singing function item; present a recording interface of a pick-up song when it is determined that a pick-up singing time corresponding to the antiphonal singing roles arrives and in response to the trigger operation for the pick-up singing function item; and present prompt information used for prompting that the pick-up singing time does not arrive, when it is determined that the pick-up singing time corresponding to the antiphonal singing roles does not arrive.

In some embodiments, after the pick-up song is recorded and obtained, the recorded pick-up song may be transmitted by using the session window, so that the member in the session window may perform pick-up singing on an unfinished part.

In this embodiment of this application, a recorded song episode is transmitted by using a session window, and a session message corresponding to the song episode and a pick-up singing function item corresponding to the song episode are presented in a session interface, thereby implementing a pick-up singing function and improving the fun of social interaction.

An embodiment of this application further provides a song processing method, including:

A terminal presents a song recording interface in response to a singing instruction triggered in a native song recording function item of an instant messaging client; records a song in response to a song recording instruction triggered in the song recording interface, and determines a reverberation effect corresponding to the recorded song; and transmits, by using a session window and in response to a song transmitting instruction, a target song obtained by processing the song based on the reverberation effect, and presents a session message corresponding to the target song in the session interface.

During actual application, the song recording function item is a native function item of the instant messaging client, which is natively embedded in the instant messaging client without using a third-party application or a third-party control. By running the instant messaging client and presenting the session interface, the user may see the song recording function item presented in the session interface instead of being floated on the session interface.

Figure 34:
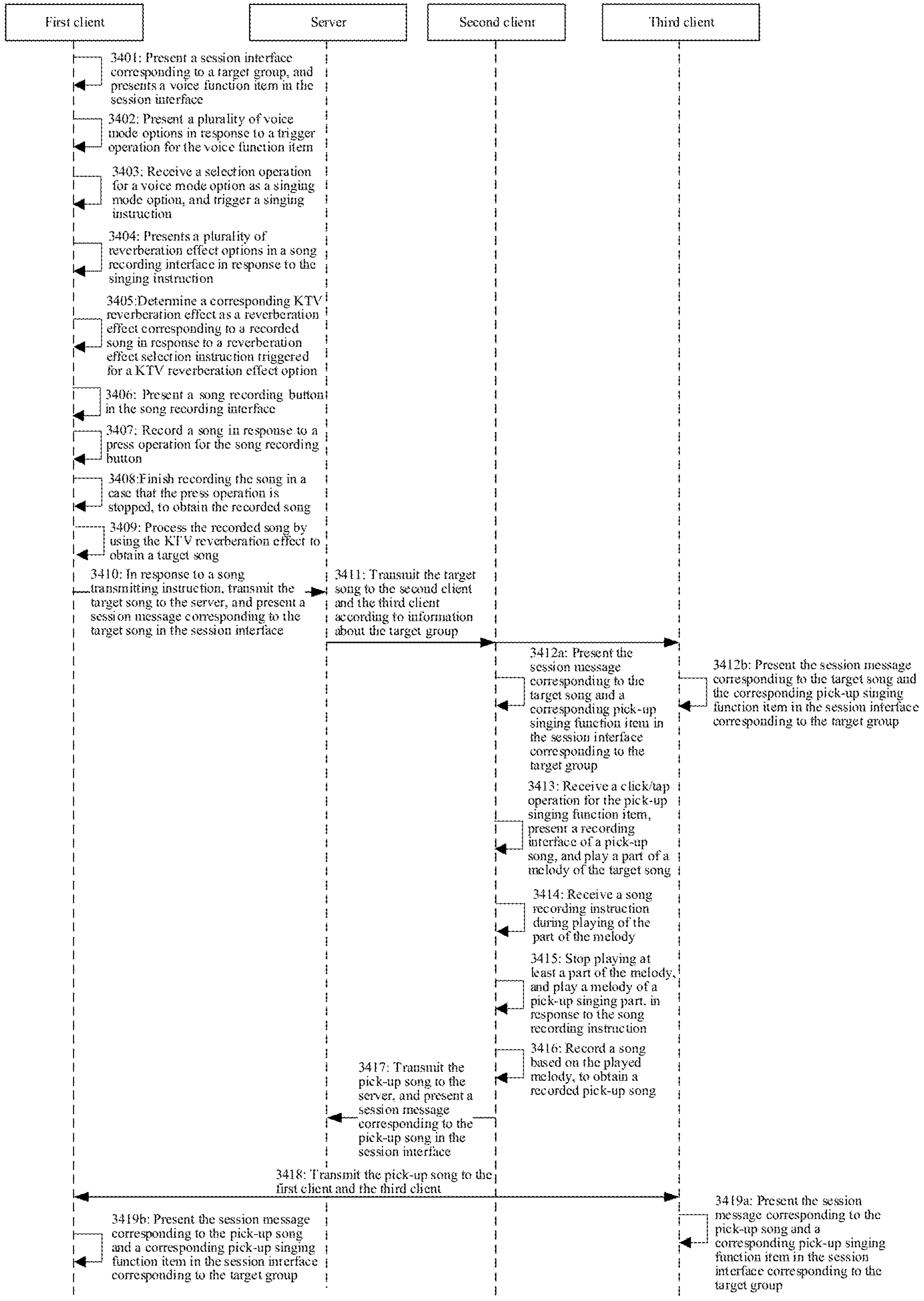
FIG. 34 is a schematic flowchart of a song processing method according to an embodiment of this application.

The following further describes the song processing method provided in this embodiment of this application. FIG. 34 is a schematic flowchart of a song processing method according to an embodiment of this application. Referring to FIG. 34, the song processing method provided in this embodiment of this application is implemented by a first client, a second client, a third client, and a server collaboratively. Users of the first client, the second client, the third client are members of a target group. During actual implementation, the song processing method according to this embodiment of this application includes the following steps.

Step 3401: A first client presents a session interface corresponding to a target group, and presents a voice function item in the session interface.

Step 3402: The first client presents a plurality of voice modes in response to a trigger operation on the voice function item.

Step 3403: The first client receives a selection operation for a voice mode as a singing mode, and triggers a singing instruction.

Step 3404: The first client presents a plurality of reverberation effects in a song recording interface in response to the singing instruction.

Step 3405: The first client determines a corresponding KTV reverberation effect as a reverberation effect corresponding to a recorded song in response to a reverberation effect selection instruction triggered for a KTV reverberation effect.

Step 3406: The first client presents a song recording button in the song recording interface.

Step 3407: The first client records a song in response to a press operation for the song recording button.

Step 3408: The first client finishes recording the song when the press operation is stopped, to obtain the recorded song.

Step 3409: The first client processes the recorded song by using the KTV reverberation effect to obtain a target song.

Step 3410: In response to a song transmitting instruction, the first client transmits the target song to a server, and presents a session message corresponding to the target song in the session interface.

Step 3411: The server transmits the target song to a second client and a third client according to information about the target group.

Step 3412*a*: The second client presents a session message corresponding to the target song and a corresponding pick-up singing function item in the session interface corresponding to the target team.

Figure 35:
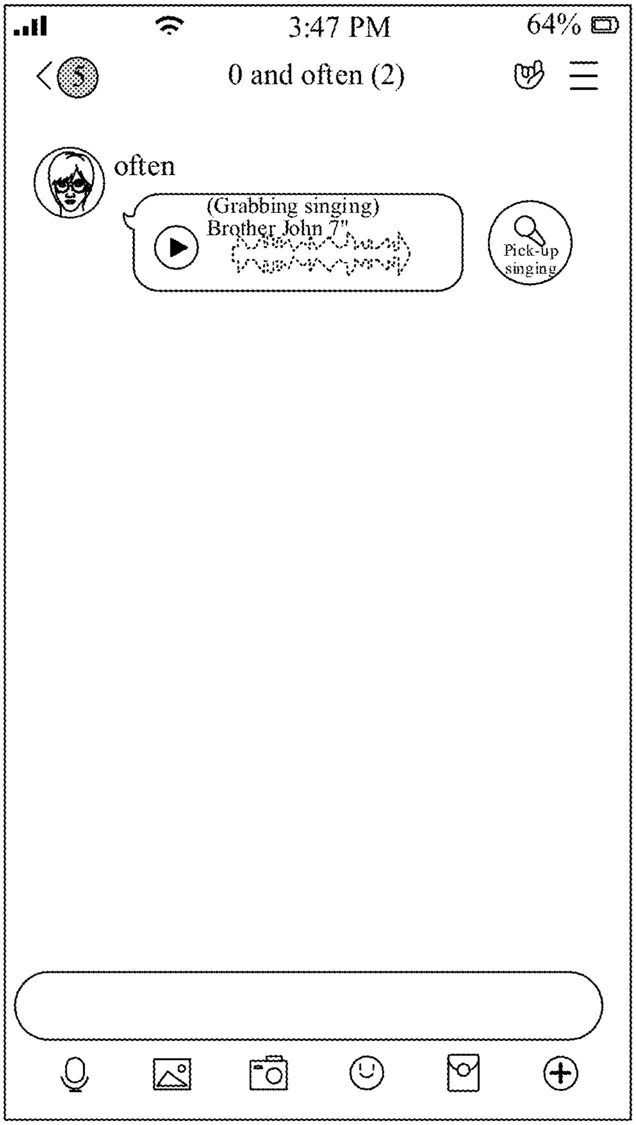
FIG. 35 is a schematic diagram of a session interface of a second client according to an embodiment of this application.

For example, FIG. 35 is a schematic diagram of a session interface of a second client according to an embodiment of this application. Referring to FIG. 35, a session message corresponding to a target song transmitted by the first client and a corresponding pick-up singing function item are presented in the session interface.

Step 3412*b*: The third client presents the session message corresponding to the target song and the corresponding pick-up singing function item in the session interface corresponding to the target group.

Step 3413: The second client receives a click/tap operation for the pick-up singing function item, presents a recording interface of a pick-up song, and plays a part of a melody of the target song.

Step 3414: The second client receives a song recording instruction during playing of the part of the melody.

Step 3415: The second client stops playing the at least a part of the melody, and plays a melody of a pick-up singing part, in response to the song recording instruction.

Step 3416: The second client records a song based on the played melody, to obtain a recorded pick-up song.

Step 3417: The second client transmits the pick-up song to the server, and presents a session message corresponding to the pick-up song in the session interface.

Figure 36:
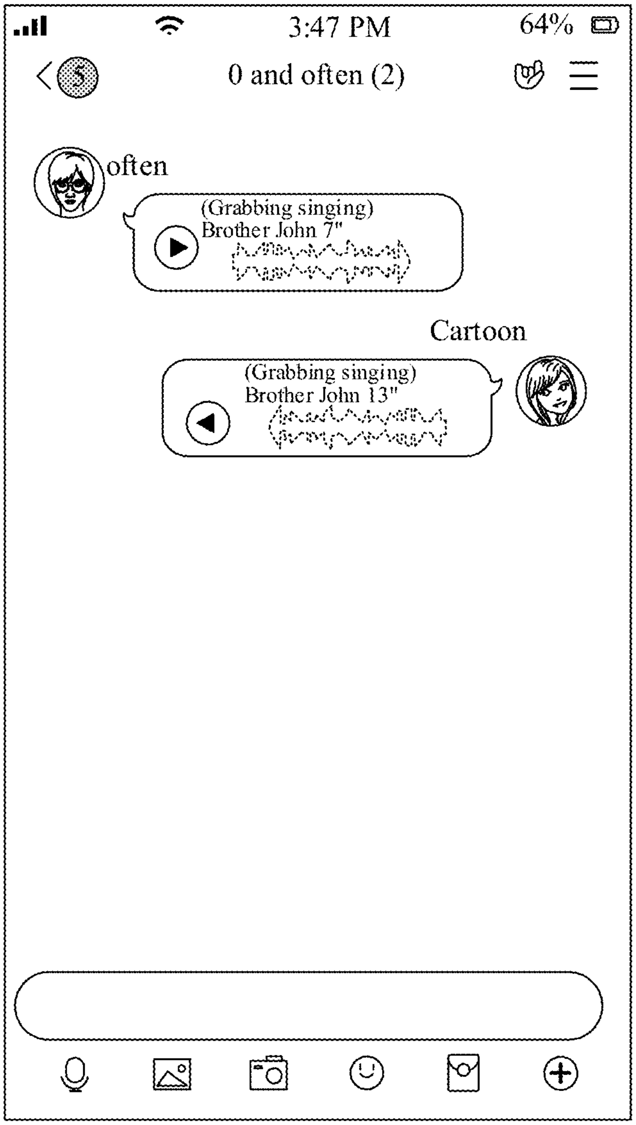
FIG. 36 is a schematic diagram of a session interface of a second client according to an embodiment of this application.

For example, FIG. 36 is a schematic diagram of a session interface of a second client according to an embodiment of this application. Referring to FIG. 36, a session message corresponding to a pick-up song is presented in the session interface. The presentation of the pick-up singing function item corresponding to the target song is canceled.

Step 3418: The server transmits the pick-up song to the first client and the third client.

Step 3419*a*: The third client presents the session message corresponding to the pick-up song and the corresponding pick-up singing function item in the session interface corresponding to the target group.

Figure 37:
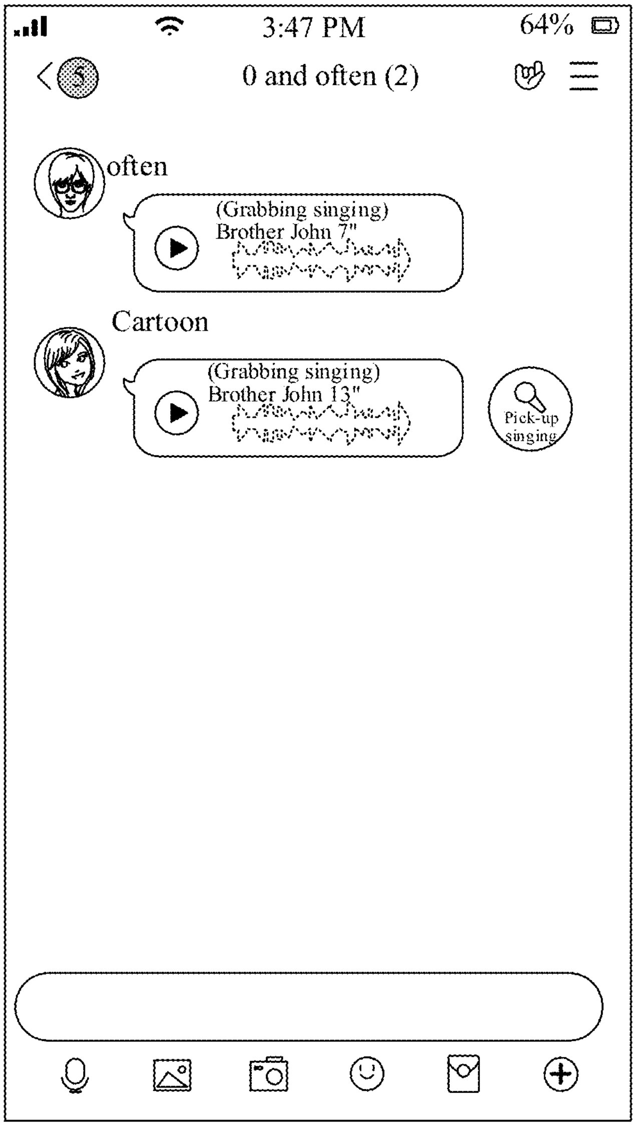
FIG. 37 is a schematic diagram of a session interface of a third client according to an embodiment of this application.

For example, FIG. 37 is a schematic diagram of a session interface of a third client according to an embodiment of this application. Referring to FIG. 37, the session message corresponding to the pick-up song and the corresponding pick-up singing function item are presented in the session interface. The presentation of the pick-up singing function item corresponding to the target song is canceled simultaneously.

Step 3419*b*: The first client presents the session message corresponding to the pick-up song and the corresponding pick-up singing function item in the session interface corresponding to the target group.

The following describes an exemplary application of this embodiment of this application in an actual application scenario.

Figure 38:
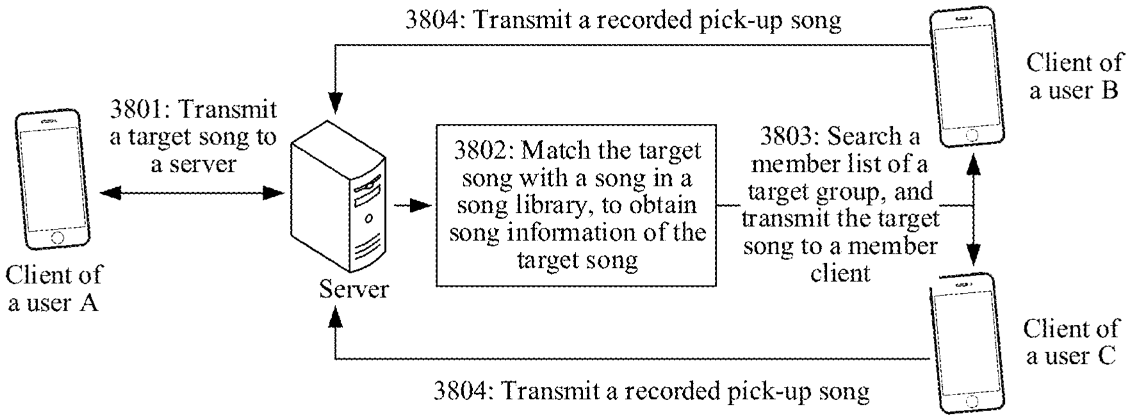
FIG. 38 is a schematic flowchart of a song processing method according to an embodiment of this application.

FIG. 38 is a schematic flowchart of a song processing method according to an embodiment of this application. Referring to FIG. 38, the song processing method provided in this embodiment of this application includes the following steps.

Step 3801: A client of a user A transmits a target song to a server.

The user A herein is an initiator of pick-up singing. The target song is obtained by processing a recorded song by using a selected reverberation effect. During actual implementation, when a singing instruction is triggered in a session interface of a target group, a song recording interface is presented. The initiator may select a reverberation effect and record a song by using the song recording interface.

In some embodiments, the singing instruction may be triggered in the following manners. Referring to FIG. 4 and FIG. 5, a session interface of a target group is first presented, and a voice function item is presented in the session interface. After a click/tap operation of the user A for the voice function item is received, a voice mode selection panel is presented, and at least two voice modes are presented in the voice mode selection panel, the voice mode including an intercom mode option, a recording mode option, and a singing mode. Subsequently, the user A may trigger a selection operation for each voice mode by sliding left and right. After receiving the selection operation of the user for the singing mode, the client of the user A triggers the singing instruction and switches to a singing mode. When the singing mode is switched, the client of the user A presents a song recording interface.

In some embodiments, the singing instruction may be triggered in the following manners. A function item corresponding to a singing mode is directly presented in a session interface of a target group, and the singing instruction is triggered by clicking/tapping the function item to switch to the singing mode. When the singing mode is switched, the client of the user A presents a song recording interface. An independent function entry may also be set for the singing mode.

Herein, referring to FIG. 7, a plurality of reverberation effects are presented in the song recording interface. The user A may trigger a selection operation for a target reverberation effect by sliding left and right. After receiving the selection operation for the target reverberation effect, the client of the user A determines a correspond target reverberation effect as a selected reverberation effect. The reverberation effect herein may be a superimposed atmospheric effect, rising and falling of tones, or the like.

In some embodiments, the user needs to select the reverberation effect only when using this function for the first time. During subsequent song recording, the previously selected reverberation effect may be selected by default. In some embodiments, the reverberation effect selection function item may also be presented in the song recording interface. After the trigger operation on the reverberation effect selection function item is received, a secondary page is presented, and at least two reverberation effects are presented in the secondary page for selection of the reverberation effect by using the secondary page.

During actual implementation, referring to FIG. 9, the user A presses a recording button, and when the user presses the recording button, the client of the user A turns on a microphone device for song recording and caches audio data locally on the client. When the user A stops pressing the recording button, the song recording is finished, and a recorded song is obtained. Moreover, the recorded song is processed by using a corresponding target reverberation effect to obtain a target song.

Herein, after the recording is completed, a confirmation page is presented. Referring to FIG. 13, the confirmation page includes a transmitting button and a cancel button. When the user A clicks/taps the transmitting button, the target song is transmitted by using the session window; Correspondingly, when the user A clicks/taps the cancel button, the target song is deleted.

In some embodiments, referring to FIG. 22, a pick-up singing mode selection function item is further presented in the confirmation page. After a click/tap operation of the user A for the selection function item is received, at least two pick-up singing modes are presented. The user A may select a pick-up singing mode based on the at least two presented pick-up singing modes. The pick-up singing mode includes: grabbing singing of all members, pick-up singing of a designated member, antiphonal singing between a male and a female, antiphonal singing in a random group, and antiphonal singing in a designated group. The pick-up singing mode is not limited to the mode shown in FIG. 22, and may further include: pick-up singing of a designated member in order, pick-up singing of members in a group in a designated order, pick-up singing of a randomly assigned member, and pick-up singing of a randomly assigned member in a group.

After the pick-up singing mode is selected, the confirmation page is returned, and the selected pick-up singing mode is presented in the confirmation page. When the user clicks/taps the transmitting button, the target song and the selected pick-up singing mode are transmitted. The target song and the pick-up singing mode herein may be compressed and packaged into a data packet, and then are transmitted. Correspondingly, after receiving the data packet, the server needs to parse the data packet to obtain the target song and the pick-up singing mode.

When the selected mode is the pick-up singing of the designated member, a selection interface of a pick-up singer is presented, to designate a session member to sing based on the interface. For example, referring to FIG. 23, a profile picture and a name of a selectable member are presented. The user clicks/taps an option near the profile picture, and selects a member participating in pick-up singing. After "OK" is clicked/tapped, it is determined that the pick-up signing mode of the designated member is switched. After the switching is completed, the confirmation page is jumped back, and the selected pick-up singing mode, that is, the pick-up singing of the designated member, is presented in the confirmation page.

Step 3802: The server matches the target song with a song in a song library, to obtain song information of the target song.

Herein, the server may match the target song with the song in the song library according to a melody and/or lyrics of the target song, and obtain the song information when there is a song matching the target song. The song information herein includes at least one of the following: a name, lyrics, a melody, or a poster. When there is no song matching the target song, the song information is empty.

When the target song is matched with the song in the song library according to the lyrics of the target song, voice identification is performed on the target song by using a voice recognition interface, to convert the target song into a text, and then the text is matched with lyrics of the song in the song library.

Herein, when there is a song matching the target song, a part sung by the user A may be further determined. If the part sung by the user A is a repeat part of the song, the user sings a lyric part appearing the first time by default. Therefore, a part to be sung by a pick-up singer may be determined.

In some embodiments, when an initiator performs song recording, a recorded part may be matched with a song in the song library. After the matching is successful, song information such as a poster or lyrics of the song is presented in the song recording interface.

Step 3803: Search a member list of a target group, and transmit the target song to a member client (including a user B client of a user B and a client of a user C).

Herein, when transmitting the target song, the client of the user A needs to further transmit group information of the target group. The server searches the member list of the target group in a local database according to the group information, to transmit the target song to the member client.

After receiving the target song, the member client presents a session message corresponding to the target song in a corresponding session interface. The session message includes a sound wave, and the sound wave is distinguished from an ordinary recording sound wave. Herein, the session message corresponding to the target song is presented in a form different from an ordinary session message, for example, presented in a form of a bubble or presented in a form of a message card.

When the session message corresponding to the target song is presented in the form of the bubble, a background of the bubble may be consistent with a background of a selected reverberation effect. A bubble length is related to a duration of the target song. When the duration is less than a duration threshold (for example, 2 minutes), a longer duration indicates a longer corresponding bubble length. When the duration is greater than the duration threshold, the bubble length is a fixed value such as 80% of a screen width.

In some embodiments, when obtaining the song information of the target song, the server transmits the song information to the client. Therefore, the session message presented by the client may include the song information (such as a song name, a song poster, and lyrics). For example, referring to FIG. 12A, the session message includes the song name.

In some embodiments, the session message may further include user information of a singer.

After the session message corresponding to the target song is presented, the user may play the target song by clicking/tapping the session message.

Step 3804: The member client transmits a recorded pick-up song to the server.

The member client herein is the client of the user B or the client of the user C. During actual implementation, referring to FIG. 16, when the current user is qualified to perform pick-up singing, a session message corresponding to a target song is presented, and a pick-up singing function item corresponding to the target song is presented simultaneously. When the user clicks/taps the pick-up singing function item, a recording interface of a pick-up song is presented. The user may record the pick-up song by using the recording interface of the pick-up song.

Herein, when obtaining the song information of the target song, and after presenting the recording interface of the pick-up song, the client may repeatedly play a melody corresponding to the first target quantity of lyrics of the pick-up song, and present all lyrics after the start of the first target quantity of lyrics. If there are less than 4 lyrics in the front of the pick-up song, a melody corresponding to all the previous lyrics is played. When the song recording instruction is received, playback of the melody corresponding to the first target quantity of lyrics of the pick-up song is paused, and the melody of the pick-up song is played, to record the pick-up song based on the played melody.

The played melody and the recorded pick-up song are processed by using a reverberation effect used by a previous person by default.

The song recording instruction herein may be operated by using a press operation for a song recording button in a recording interface, and a song is recorded during pressing. When the press operation is stopped, recording of the song is finished. During actual implementation, after recording of the song is finished, the recorded pick-up song may be directly transmitted to the server, and a position of the pick-up song in the entire song is recorded, to prompt a next user to sing the pick-up song from this part.

During actual implementation, after the pick-up song is transmitted to the server, the server pushes the pick-up song to the member client. Referring to FIG. 37, the member client presents a session message corresponding to the pick-up song for subsequent pick-up singing.

Herein, during recording of the pick-up song, the lyrics are scrollably presented according to a speed of the song, causing the lyrics presented in a target region to correspond to the played melody. For example, lyrics in a penultimate line in a lyric display region may correspond to the played melody.

If there is no singing voice of anyone in the recorded pick-up song, prompt information is presented after recording is completed, to prompt that the recorded pick-up song includes no singing voice of people. For example, the prompt information may be "You didn't sing". The prompt information may be presented in a form of a bubble prompt, for example, may be presented by using the bubble prompt shown in FIG. 21. After the prompt information is presented, the recorded pick-up song may be automatically deleted.

In some embodiments, whether the current user is qualified to perform pick-up singing is determined according to the pick-up singing mode selected by the user A.

When the pick-up singing mode is an all-member grabbing singing mode, a first person who transmits a pick-up song is considered to perform pick-up singing successfully. When a user successfully performs pick-up singing, the pick-up singing function item corresponding to the target song is hided. In addition, if a user is recording the pick-up song by using the recording interface of the pick-up song, prompt information, prompt information, for example, "Someone has already performed pick-up singing", is presented in the recording interface of the pick-up song. The recorded pick-up song is not automatically deleted and cannot be transmitted.

When the pick-up singing mode is pick-up singing of a designated member, it is determined whether the current user is a designated member. If the current user is the designated member, the current user has a pick-up singing permission. Otherwise, the current user is not qualified to perform pick-up singing.

When the pick-up singing mode is antiphonal singing between a male and a female, gender of a singer of the target song is determined. If the singer of the target song is a male, only when the current user is a female, the current user is qualified to perform pick-up singing. If the singer of the target song is a female, only when the current user is a male, the current user is qualified to perform pick-up singing.

When the pick-up singing mode is antiphonal singing in the random group, everyone is qualified to perform pick-up singing. After a first pick-up singing member transmits a pick-up song, subsequent members participating in pick-up singing may choose to join a group of the initiator, or join a group of the first pick-up singing member. Referring to FIG. 24, a group selection interface is presented. Profile pictures, group information (for example, a quantity of users joining a group and user information), and a join button corresponding to each group of the initiator and the first pick-up singing member are presented in the interface, and a corresponding group is joined by clicking/tapping the join button. A member who is qualified to perform pick-up singing and a member transmitting a corresponding session message are to be in different groups.

When the pick-up singing mode is the antiphonal singing in the designated group, the initiator selects members of two parties when selecting the pick-up singing mode. When the current user is a member of the two parties, and when it is the turn of the group in which the current user is located to perform pick-up singing, it is determined that the current user is qualified to perform pick-up singing. Referring to FIG. 25, when the initiator selects group members of the two parties, a selection interface of selecting a group member of our party is first presented, and information (for example, profile pictures and user names) about all members of a group in which our party is located is presented. Selection is performed by clicking/tapping an option corresponding to a corresponding member. After the selection is completed, a next step is clicked/tapped. A selection interface of selecting a group member of the other party, and information about other members than the group members of our party in a group in which the other members are located is presented. Similarly, the selection is performed by clicking/tapping an option corresponding to a corresponding member.

In some embodiments, the user may perform a left-and-right slide operation based on the presented recording interface of the pick-up song. The terminal switches the reverberation effect according to an interactive operation of the user. After the reverberation effect is switched, prompt information corresponding to the switched reverberation effect is presented. For example, referring to FIG. 19, when the reverberation effect is switched to KTV, prompt information "KTV" is presented in the recording interface. The prompt information herein disappears automatically after a preset time. For example, the prompt information may disappear after 1.5 s.

In the designated-group antiphonal singing mode, the random-group antiphonal singing mode, the male and female antiphonal singing mode, and the designated-member pick-up singing mode, when a plurality of members are qualified to perform pick-up singing, a same grabbing singing manner is used, that is, the first member who transmits the pick-up song is considered to successfully perform pick-up singing.

Referring to FIG. 27, when pick-up singing is performed the entire song, and the client presents a last session message corresponding to the pick-up song, the corresponding pick-up singing function item is not presented. Prompt information that completion of the pick-up singing is presented. Herein, referring to FIG. 28, different prompt information may be presented for different pick-up singing modes.

When the prompt information is presented, a viewing button corresponding to the prompt information is presented. The user clicks/taps the viewing button corresponding to the prompt information. The client presents a details page.

When corresponding song information is obtained, referring to FIG. 29, the song information, a playback button, and a playback progress bar are presented in the details page. The song information includes a song poster, a song name, lyrics, and the like. Moreover, according to a part sung by each user, a user profile picture of a singer is presented near lyrics.

In some embodiments, a sharing button for the details page may further be presented, and the user may trigger a corresponding sharing operation by using the sharing button to share the details page. Referring to FIG. 31, a link of the details page may be transmitted to another user. The details page may be presented by clicking/tapping the link.

If the initiator sings the entire song, the prompt information of the completion of the pick-up singing is not prompted, and the pick-up singing function item is also not presented.

When there is no song matching the target song, the song information cannot be presented in the details page. Referring to FIG. 28, a profile picture and a corresponding sound wave of each singer are presented in the details page in a pick-up singing order. During playing, a song recorded by each singer is played in the pick-up singing order.

Figure 39:
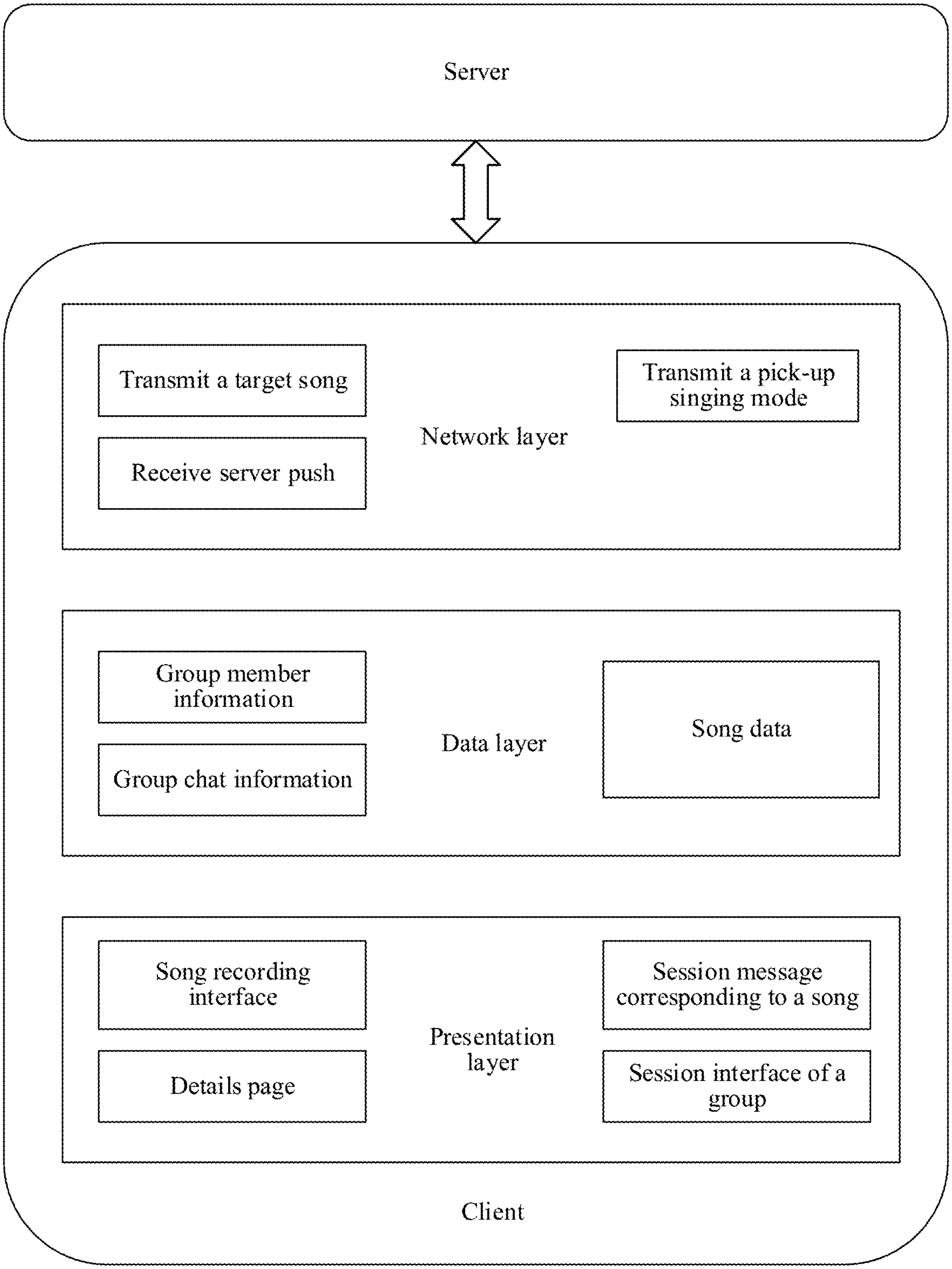
FIG. 39 is a schematic structural diagram of a client according to an embodiment of this application.

The client is described below. FIG. 39 is a schematic structural diagram of a client according to an embodiment of this application. Referring to FIG. 39, the client includes 3 layers: a network layer, a data layer, and a presentation layer.

The network layer is configured for communication between the client and a backend server, including: transmitting data such as a target song, song information, and a pick-up singing mode to the server, and receiving data pushed by the server. After receiving the data, the client updates the data to the data layer. An underlying communication protocol herein is a UDP. When the network cannot be connected, it will prompt failure.

The data layer is configured to store client-related data, mainly including two parts. The first part is group information, including group member information (an account, a nickname, and the like) and group chat information (chat text data, chat time, and the like). The second part is song data such as a song recorded by a user, a song processed by using a reverberation effect, song information (a song name, lyrics, and the like), and a pick-up singing mode. The data is stored in an internal memory cache and a local database. When there is no data in the internal memory cache, corresponding data is loaded from the database, and is cached in the internal memory cache to improve an obtaining speed. When receiving the data of the server, the client updates the date to the internal memory cache and the database simultaneously. The data layer herein provides the data for the presentation layer to use.

The presentation layer is configured to presents a user interface, mainly including four parts. The first part is a song recording interface (including a recording interface of initiating a song and a recording interface of a pick-up song), including a song recording button, a reverberation effect switching slider, and the like. A recording interface panel of the pick-up song further includes scrollably displaying of lyrics. A standard system control is responsible for displaying the song recording interface and responds to a user event. When the song recording button is pressed, a microphone is invoked for recording. The second part is a session message (presented in a form of a bubble) corresponding to a song, including a recording playback button, a pick-up/repeat singing button, presentation of a song name, and the like. When a current user meets a condition in a pick-up singing mode, a pick-up singing function item is further presented. The standard system control is responsible for presenting the session message. When the recording playback button is clicked/tapped, a device speaker is invoked for playing. The third part is a session interface of a group, including a group name, a group message list, an input box, and the like. The standard system control is responsible for presenting the session interface. The fourth part is a details page. When a user performs sharing, another user may enter the details page for check. In the details page, a recorded song and corresponding lyrics may be played in a chronological order (when there is a song matching the target song). The standard list control is responsible for presenting the details page, and the user may drag the list to check. When the recorded song is played, the device speaker is started, and the recorded song is played by using a system media control.

The presentation layer is also responsible for responding to a user interactive operation, monitoring clicking/tapping and dragging events, and calling back to a corresponding function for processing, which is supported by the standard system control.

In some embodiments, a chorus function may be provided, that is, the client presents a chorus function button while presenting a session message corresponding to a song, and triggers a chorus instruction by clicking/tapping the chorus function button. The chorus instruction may also be triggered in other manners, for example, double-clicking/tapping a session message, and sliding a session message.

After the chorus instruction is received, a recording interface of a chorus song is presented. The chorus song is recorded based on the recording interface of the chorus song. Content of the recorded song is to be the same as that of the song in the corresponding session message. After the chorus is completed, a part of same song content is synthesized together.

The recording interface of the chorus song may be presented in a full-screen form. Lyrics and information about users participating in the chorus may be presented in the recording interface of the chorus song.

Moreover, after the chorus is finished, each member participating in the chorus may be scored. A ranking of scores may be presented, or a highest scorer may be given a title that may be used for displaying.

The embodiments of this application have the following beneficial effects:

1) A social scene is enriched, the social interestingness is improved, and a user is allowed to interact socially in a new pick-up singing manner, so that product attractiveness of the platform is increased, thereby allowing more young users to participate.
2) An innovative karaoke method for a singing lover is provided, which greatly reduces participation costs of the karaoke and improves interestingness of the karaoke, thereby greatly increasing frequencies of using a social application to record a song by the user.

The following illustrates an exemplary structure in which a song processing apparatus 455 provided in this embodiment of this application is implemented as a software module. In some embodiments, as shown in FIG. 2, a software module in the song processing apparatus 455 stored in the memory 450 may include:

a first presentation module 4551, configured to present a song recording interface in response to a singing instruction triggered in a session interface; a first recording module 4552, configured to record a song in response to a song recording instruction triggered in the song recording interface, and determine a reverberation effect corresponding to the recorded song; a first transmitting module 4553, configured to transmit, by using a session window and in response to a song transmitting instruction, a target song obtained by processing the song based on the reverberation effect; and a second presentation module 4554, configured to present a session message corresponding to the target song in the session interface, and present a pick-up singing function item corresponding to the target song, the pick-up singing function item being used for implementing pick-up singing of the target song by a session member in the session window.

In some embodiments, the first presentation module 4551 is further configured to present the session interface and present a voice function item in the session interface; present at least two voice modes in response to a trigger operation on the voice function item; and receive a selection operation for the voice mode as a singing mode, and trigger the singing instruction.

In some embodiments, the first presentation module 4551 is further configured to present the session interface and present a singing function item in the session interface; and trigger the singing instruction in response to the trigger operation for the singing function item.

In some embodiments, the first recording module 4552 is further configured to present at least two reverberation effects in the song recording interface; and determine a corresponding target reverberation effect as the reverberation effect corresponding to the recorded song in response to a reverberation effect selection instruction triggered for a target reverberation effect.

In some embodiments, the first recording module 4552 is further configured to present a reverberation effect selection function item in the song recording interface; present a reverberation effect selection interface in response to a trigger operation on the reverberation effect selection function item; present at least two reverberation effects in the reverberation effect selection interface; and determine a corresponding target reverberation effect as the reverberation effect corresponding to the recorded song in response to the reverberation effect selection instruction triggered for the target reverberation effect.

In some embodiments, the first recording module 4552 is further configured to present a song recording button in the song recording interface; record the song in response to a press operation for the song recording button; and finish recording the song when the press operation is stopped, to obtain the recorded song.

In some embodiments, the first recording module 4552 is further configured to present a song recording button in the song recording interface; record the song in response to a press operation for the song recording button, and recognize the recorded song during recording; present corresponding song information in the song recording interface when a corresponding song is recognized; and finish recording the song when the press operation is stopped, to obtain the recorded song.

In some embodiments, the first recording module 4552 is further configured to obtain a song recording background image corresponding to the reverberation effect; use the song recording background image as a background of the song recording interface, and present a song recording button in the song recording interface; record the song in response to a press operation for the song recording button; and finish recording the song when the press operation is stopped, to obtain the recorded song.

In some embodiments, the second presentation module 4554 is further configured to match the target song with a song in a song library, to obtain a matching result; determine, when the matching result represents that there is a song matching the target song, song information of the target song according to the song matching the target song; and present the session message that carries the song information and corresponds to the target song in the session interface.

In some embodiments, the second presentation module 4554 is further configured to obtain a bubble style corresponding to the reverberation effect; determine, according to a duration of the target song, a bubble length matching the duration; and present, based on the bubble style and the bubble length, the session message corresponding to the target song by using a bubble card.

In some embodiments, the second presentation module 4554 is further configured to obtain a song poster corresponding to the target song; and use the song poster as a background of a message card of the session message, and present the session message of the target song in the session interface by using the message card.

In some embodiments, the second presentation module 4554 is further configured to: present a recording interface of a pick-up song in response to a trigger operation for the pick-up singing function item; obtain, when the target song is a song episode, lyric information of the song corresponding to the song episode; and present, according to the lyric information, lyrics corresponding to the song episode and lyrics of a pick-up singing part in the recording interface of the pick-up song.

In some embodiments, the second presentation module 4554 is further configured to present a recording interface of a pick-up song in response to a trigger operation for the pick-up singing function item; obtain a melody of a song corresponding to the song episode; and play at least a part of the melody of the song episode.

In some embodiments, the second presentation module 4554 is further configured to receive a song recording instruction during playing of the at least a part of the melody; stop playing the at least a part of the melody, and play a melody of a pick-up singing part, in response to the song recording instruction; and record a song based on the melody of the pick-up singing part, to obtain a recorded pick-up song.

In some embodiments, the second presentation module 4554 is further configured to obtain lyric information of the song corresponding to the song episode; and scrollably display corresponding lyrics with playing of the melody of the pick-up singing part during recording of the pick-up song.

In some embodiments, the second presentation module 4554 is further configured to present a recording interface of a pick-up song, in response to a trigger operation for the pick-up singing function item; obtain the pick-up song recorded based on the recording interface of the pick-up song; and use the reverberation effect of the song episode as a reverberation effect of the pick-up song, to process the pick-up song.

In some embodiments, the second presentation module 4554 is further configured to present a recording interface of a pick-up song in response to a trigger operation for the pick-up singing function item; determine, when the pick-up song is recorded based on the recording interface of the pick-up song, a position of the recorded pick-up song in a song corresponding to the song episode, the position being used as a start position of the pick-up singing; and transmit a session message that carries the position and corresponds to the pick-up song, and present the session message of the pick-up song in the session interface, the session message of the pick-up song indicating the start position of pick-up singing.

In some embodiments, the second presentation module 4554 is further configured to present a recording interface of a pick-up song in response to a trigger operation for the pick-up singing function item; and present prompt information when it is determined that the pick-up song recorded based on the recording interface of the pick-up song includes no human voice, the prompt information being used for prompting that the recorded pick-up song includes no human voice.

In some embodiments, the second presentation module 4554 is further configured to present, when the session interface is a group chat session interface, at least two pick-up singing modes in the group chat session interface; and determine, in response to a pick-up singing mode selection instruction triggered for a target pick-up singing mode, a selected pick-up singing mode as a target pick-up singing mode, the pick-up singing mode being used for indicating a session member having a pick-up singing permission. The presenting a pick-up singing function item corresponding to the target song includes: presenting, when it is determined that there is the pick-up singing permission according to the target pick-up singing mode, the pick-up singing function item corresponding to the target song.

In some embodiments, the second presentation module 4554 is further configured to receive a trigger operation corresponding to the pick-up singing function item when the target pick-up singing mode is a grabbing singing mode; present a recording interface of a pick-up song when it is determined that the trigger operation corresponding to the pick-up singing function item is a first received trigger operation corresponding to the pick-up singing function item; and present prompt information used for prompting that a grabbing singing permission is not obtained, when it is determined that the trigger operation corresponding to the pick-up singing function item has been received before the trigger operation corresponding to the pick-up singing function item.

In some embodiments, the second presentation module 4554 is further configured to receive a pick-up song recorded based on the pick-up singing function item, when the target pick-up singing mode is a grabbing singing mode; receive a transmitting instruction for the pick-up song; transmit the pick-up song when it is determined that the transmitting instruction is a first received pick-up song transmitting instruction for the song episode, and present prompt information used for prompting that a grabbing singing permission is not obtained, when it is determined that the pick-up song transmitting instruction for the song episode has been received before the transmitting instruction is received.

In some embodiments, the second presentation module 4554 is further configured to obtain antiphonal singing roles when the target pick-up singing mode is a group antiphonal singing mode; receive a trigger operation for the pick-up singing function item; present a recording interface of a pick-up song when it is determined that a pick-up singing time corresponding to the antiphonal singing roles arrives and in response to the trigger operation for the pick-up singing function item; and present prompt information used for prompting that the pick-up singing time does not arrive, when it is determined that the pick-up singing time corresponding to the antiphonal singing roles does not arrive.

In some embodiments, the second presentation module 4554 is further configured to receive a session message of a pick-up song corresponding to the song episode; and present a session message of the pick-up song corresponding to the song episode and cancel the presented pick-up singing function item.

In some embodiments, the second presentation module 4554 is further configured to receive and present the session message corresponding to the pick-up song, the session message carrying prompt information indicating that the pick-up singing is completed; and present a details page in response to a viewing operation for the prompt information, the details page being used for sequentially playing, when a trigger operation of playing a song is received, a song recorded by a session member participating in pick-up singing in an order of participating in pick-up singing.

In some embodiments, the second presentation module 4554 is further configured to present at least one of lyrics of the song recorded by the session member participating in pick-up singing or a user profile picture of the session member participating in pick-up singing in the details page.

In some embodiments, the second presentation module 4554 is further configured to present a sharing function button for the details page in the details page, the sharing function button being used for sharing a completed pick-up song.

In some embodiments, the second presentation module 4554 is further configured to: receive a trigger operation for the sharing function button; and transmit, when it is determined that a corresponding sharing permission is available, a link corresponding to the completed pick-up song in response to the trigger operation for the sharing function button.

In some embodiments, the second presentation module 4554 is further configured to present a chorus function item corresponding to the target song, the chorus function item being used for presenting, when a trigger operation for the chorus function item is received, a recording interface of a chorus song, and recording a song the same as the target song based on the recording interface of the chorus song.

An embodiment of this application provides a song processing apparatus, including:

- a third presentation module, configured to present a song recording interface in response to a singing instruction triggered in a session interface; a second recording module, configured to record a song in response to a song recording instruction triggered in the song recording interface, to obtain a recorded song episode; a second transmitting module, configured to transmit the recorded song episode by using the session window in response to a song transmitting instruction; and a fourth presentation module, configured to present a session message corresponding to the song episode and a pick-up singing function item corresponding to the song episode in the session interface, the pick-up singing function item being used for implementing pick-up singing of the song episode by a session member in the session window.

An embodiment of this application provides a song processing apparatus, including:

- a receiving module, configured to receive a recorded song episode transmitted by using a session window; and a fifth presentation module, configured to receive a song episode of a target song transmitted by using the session window, the song episode being recorded based on a song recording interface, the song recording interface being triggered in a singing instruction of a session interface of a transmitting end; and present a session message corresponding to the song episode and a pick-up singing function item corresponding to the song episode in the session interface, the pick-up singing function item being used for implementing pick-up singing of the song episode.

An embodiment of this application provides a song processing apparatus, including:

- a sixth presentation module, configured to present a song recording interface in response to a singing instruction triggered in a native song recording function item of an instant messaging client; a third recording module, configured to record a song in response to a song recording instruction triggered in the song recording interface, and determine a reverberation effect corresponding to the recorded song; and a seventh presentation module, configured to transmit, by using a session window and in response to a song transmitting instruction, a target song obtained by processing the song based on the reverberation effect, and present a session message corresponding to the target song in the session interface.

An embodiment of this application provides an electronic device, including:

a memory, configured to store executable instructions; and a processor, configured to implement the song processing method provided in the embodiments of this application when executing the executable instructions stored in the memory.

An embodiment of this application provides a computer-readable storage medium, storing executable instructions, the executable instructions, when executed by a processor, implementing the song processing method according to the embodiments of this application.

An embodiment of this application provides a computer-readable storage medium storing executable instructions, the executable instructions, when executed by a processor, causing the processor to perform the song processing method, for example, the song processing method shown in FIG. 3, provided in the embodiments of this application.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts). In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A song processing method performed by a computer device, the method comprising:

presenting a song recording interface in response to a singing instruction triggered in a session interface of a group chat session;

recording a song in response to a song recording instruction triggered in the song recording interface;

determining a reverberation effect for the recorded song;

transmitting, in response to a song transmitting instruction, a target song obtained by processing the song based on the reverberation effect to members of the group chat session; and presenting a session message corresponding to the target song in the session interface and presenting a pick-up singing function icon corresponding to the target song next to the session message in the session interface, the session message having an icon for playing the target song in response to a user selection of the icon and the pick-up singing function icon being used for implementing pick-up singing of the target song by a member of the group chat session, wherein the icon of the session message has a length that corresponds to a duration of the target song and a visual style that corresponds to the reverberation effect of the target song.

2. The method according to claim 1, wherein before the presenting a song recording interface in response to a singing instruction triggered in a session interface, the method further comprises:

presenting the session interface and presenting a voice function item in the session interface;

presenting at least two voice modes in response to a trigger operation on the voice function item; and receiving a selection operation for the voice mode as a singing mode, and triggering the singing instruction.

3. The method according to claim 1, wherein the determining a reverberation effect corresponding to the recorded song comprises:

presenting a reverberation effect selection function item in the song recording interface;

presenting a reverberation effect selection interface in response to a trigger operation on the reverberation effect selection function item;

presenting at least two reverberation effects in the reverberation effect selection interface; and determining a corresponding target reverberation effect as the reverberation effect corresponding to the recorded song in response to a reverberation effect selection instruction triggered for a target reverberation effect.

4. The method according to claim 1, wherein the recording a song in response to a song recording instruction triggered in the song recording interface comprises:

obtaining a song recording background image corresponding to the reverberation effect;

using the song recording background image as a background of the song recording interface, and presenting a song recording button in the song recording interface;

recording the song in response to a press operation for the song recording button; and finishing recording the song when the press operation is stopped, to obtain the recorded song.

5. The method according to claim 1, wherein the presenting a session message corresponding to the target song in the session interface comprises:

obtaining a song poster corresponding to the target song; and using the song poster as a background of a message card of the session message, and presenting the session message corresponding to the target song in the session interface through the message card.

6. The method according to claim 1, wherein the presenting a session message corresponding to the target song in the session interface comprises:

matching the target song with a song in a song library, to obtain a matching result;

determining, when the matching result represents that there is a song matching the target song, song information of the target song according to the song matching the target song; and presenting the session message that carries the song information and corresponds to the target song in the session interface.

7. The method according to claim 1, wherein after the presenting a pick-up singing function icon corresponding to the target song, the method further comprises:

presenting a recording interface of a pick-up song in response to a trigger operation for the pick-up singing function icon;

obtaining, when the target song is a song episode, a melody of a song corresponding to the song episode;

playing at least a part of the melody of the song episode;

receiving a song recording instruction during playing of the at least a part of the melody;

stopping playing the at least a part of the melody, and playing a melody of a pick-up singing part, in response to the song recording instruction; and recording a song based on the melody of the pick-up singing part, to obtain a recorded pick-up song.

8. The method according to claim 1, wherein after the presenting a pick-up singing function icon corresponding to the target song, the method further comprises:

presenting a recording interface of a pick-up song in response to a trigger operation for the pick-up singing function icon;

determining, when the pick-up song is recorded based on the recording interface of the pick-up song, a position of the recorded pick-up song in a song corresponding to the target song, the position being used as a start position of pick-up singing;

transmitting a session message that carries the position and corresponds to the pick-up song; and presenting the session message of the pick-up song in the session interface, the session message of the pick-up song indicating the start position of pick-up singing.

9. The method according to claim 1, further comprising:

presenting at least two pick-up singing modes in the group chat session interface; and determining, in response to a pick-up singing mode selection instruction triggered for a target pick-up singing mode, a selected pick-up singing mode as a target pick-up singing mode, the pick-up singing mode being used for indicating a session member having a pick-up singing permission, wherein the presenting a pick-up singing function icon corresponding to the target song comprises:

presenting, when it is determined that there is the pick-up singing permission according to the target pick-up singing mode, the pick-up singing function icon corresponding to the target song.

10. The method according to claim 1, wherein after the presenting a pick-up singing function icon corresponding to the target song, the method further comprises:

receiving and presenting a session message corresponding to a pick-up song, the session message carrying prompt information indicating that pick-up singing is completed; and presenting a details page in response to a viewing operation for the prompt information, the details page being used for sequentially playing, when a trigger operation of playing a song is received, a song recorded by a session member participating in pick-up singing in an order of participating in pick-up singing.

11. The method according to claim 1, further comprising:

presenting a chorus function item corresponding to the target song;

the chorus function item being used for presenting, when a trigger operation for the chorus function item is received, a recording interface of a chorus song, and recording a song the same as the target song based on the recording interface of the chorus song.

12. A computer device, comprising:

a memory, configured to store executable instructions; and a processor, configured to, when executing the executable instructions stored in the memory, implement a song processing method including:

presenting a song recording interface in response to a singing instruction triggered in a session interface of a group chat session;

recording a song in response to a song recording instruction triggered in the song recording interface;

determining a reverberation effect for the recorded song;

transmitting, in response to a song transmitting instruction, a target song obtained by processing the song based on the reverberation effect to members of the group chat session; and presenting a session message corresponding to the target song in the session interface and presenting a pick-up singing function icon corresponding to the target song next to the session message in the session interface, the session message having an icon for playing the target song in response to a user selection of the icon and the pick-up singing function icon being used for implementing pick-up singing of the target song by a member of the group chat session, wherein the icon of the session message has a length that corresponds to a duration of the target song and a visual style that corresponds to the reverberation effect of the target song.

13. The computer device according to claim 12, wherein the determining a reverberation effect corresponding to the recorded song comprises:

presenting a reverberation effect selection function item in the song recording interface;

presenting a reverberation effect selection interface in response to a trigger operation on the reverberation effect selection function item;

presenting at least two reverberation effects in the reverberation effect selection interface; and determining a corresponding target reverberation effect as the reverberation effect corresponding to the recorded song in response to a reverberation effect selection instruction triggered for a target reverberation effect.

14. The computer device according to claim 12, wherein the presenting a session message corresponding to the target song in the session interface comprises:

matching the target song with a song in a song library, to obtain a matching result;

determining, when the matching result represents that there is a song matching the target song, song information of the target song according to the song matching the target song; and presenting the session message that carries the song information and corresponds to the target song in the session interface.

15. The computer device according to claim 12, wherein the method further comprises:

presenting at least two pick-up singing modes in the group chat session interface; and determining, in response to a pick-up singing mode selection instruction triggered for a target pick-up singing mode, a selected pick-up singing mode as a target pick-up singing mode, the pick-up singing mode being used for indicating a session member having a pick-up singing permission, wherein the presenting a pick-up singing function icon corresponding to the target song comprises:

presenting, when it is determined that there is the pick-up singing permission according to the target pick-up singing mode, the pick-up singing function icon corresponding to the target song.

16. A non-transitory computer-readable storage medium, storing executable instructions, the executable instructions, when executed by a processor of a computer device, causing the computer device to implement a song processing method including:

presenting a song recording interface in response to a singing instruction triggered in a session interface of a group chat session;

recording a song in response to a song recording instruction triggered in the song recording interface;

determining a reverberation effect for the recorded song;

transmitting, in response to a song transmitting instruction, a target song obtained by processing the song based on the reverberation effect to members of the group chat session; and presenting a session message corresponding to the target song in the session interface and presenting a pick-up singing function icon corresponding to the target song next to the session message in the session interface, the session message having an icon for playing the target song in response to a user selection of the icon and the pick-up singing function icon being used for implementing pick-up singing of the target song by a member of the group chat session, wherein the icon of the session message has a length that corresponds to a duration of the target song and a visual style that corresponds to the reverberation effect of the target song.

17. The non-transitory computer-readable storage medium according to claim 16, wherein the determining a reverberation effect corresponding to the recorded song comprises:

presenting a reverberation effect selection function item in the song recording interface;

presenting a reverberation effect selection interface in response to a trigger operation on the reverberation effect selection function item;

presenting at least two reverberation effects in the reverberation effect selection interface; and determining a corresponding target reverberation effect as the reverberation effect corresponding to the recorded song in response to a reverberation effect selection instruction triggered for a target reverberation effect.

18. The non-transitory computer-readable storage medium according to claim 16, wherein the presenting a session message corresponding to the target song in the session interface comprises:

matching the target song with a song in a song library, to obtain a matching result;

determining, when the matching result represents that there is a song matching the target song, song information of the target song according to the song matching the target song; and presenting the session message that carries the song information and corresponds to the target song in the session interface.

19. The non-transitory computer-readable storage medium according to claim 16, wherein the method further comprises:

presenting at least two pick-up singing modes in the group chat session interface; and determining, in response to a pick-up singing mode selection instruction triggered for a target pick-up singing mode, a selected pick-up singing mode as a target pick-up singing mode, the pick-up singing mode being used for indicating a session member having a pick-up singing permission, wherein the presenting a pick-up singing function icon corresponding to the target song comprises:

presenting, when it is determined that there is the pick-up singing permission according to the target pick-up singing mode, the pick-up singing function icon corresponding to the target song.

* * * * *